United States Patent
Ohido et al.

(10) Patent No.: US 6,853,473 B2
(45) Date of Patent: Feb. 8, 2005

(54) FARADAY ROTATOR AND OPTICAL DEVICE COMPRISING THE SAME, AND ANTIREFLECTION FILM AND OPTICAL DEVICE COMPRISING THE SAME

(75) Inventors: Atsushi Ohido, Chuo-ku (JP); Kenichi Tohchi, Chuo-ku (JP); Kazuhito Yamasawa, Chuo-ku (JP); Shinichiro Kakei, Chuo-ku (JP)

(73) Assignee: TDK Corporation, Tokyo (JP)

( * ) Notice: Subject to any disclaimer, the term of this patent is extended or adjusted under 35 U.S.C. 154(b) by 19 days.

(21) Appl. No.: 10/347,264

(22) Filed: Jan. 21, 2003

(65) Prior Publication Data

US 2003/0137718 A1 Jul. 24, 2003

(30) Foreign Application Priority Data

| | | | |
|---|---|---|---|
| Jan. 24, 2002 | (JP) | ...... | 2002-015109 |
| Mar. 14, 2002 | (JP) | ...... | 2002-070454 |
| Sep. 9, 2002 | (JP) | ...... | 2002-262297 |
| Dec. 5, 2002 | (JP) | ...... | 2002-353300 |

(51) Int. Cl.$^7$ .............................................. G02F 1/09
(52) U.S. Cl. ...................................... 359/280; 359/324
(58) Field of Search ............................. 359/280, 281, 359/282, 283, 258, 320, 324, 484; 372/27, 37, 66

(56) References Cited

U.S. PATENT DOCUMENTS

| | | | | |
|---|---|---|---|---|
| 5,640,516 A | * | 6/1997 | Iwatsuka et al. | ............ 359/280 |
| 5,801,875 A | * | 9/1998 | Brandle et al. | ............. 359/321 |
| 5,812,304 A | * | 9/1998 | Shirasaki et al. | ........... 359/324 |

FOREIGN PATENT DOCUMENTS

| | | |
|---|---|---|
| JP | A 4-230701 | 8/1992 |
| JP | A 6-51255 | 2/1994 |
| JP | A 10-1398 | 1/1998 |

* cited by examiner

Primary Examiner—Hung Xuan Dang
Assistant Examiner—Tuyen Tra
(74) Attorney, Agent, or Firm—Oliff & Berridge, PLC

(57) ABSTRACT

The invention relates to an optical device for polarizing light by changing its Faraday rotation angle, such as optical attenuators, optical switches or polarization controllers; and its object is to provide such an optical device which can be driven even by small-sized and power-saving magnetic circuits and in which the insertion loss in the Faraday rotator may be reduced. The optical device comprises a Faraday rotator formed of a garnet single crystal, and a magnetic circuit applying an external magnetic field H that is smaller than the saturation magnetic field Hs of the Faraday rotator to the Faraday rotator.

27 Claims, 14 Drawing Sheets

×50

(a)　　　　(b)

(a)　　　　(b)

FARADAY ROTATOR AND OPTICAL DEVICE COMPRISING THE SAME, AND ANTIREFLECTION FILM AND OPTICAL DEVICE COMPRISING THE SAME

BACKGROUND OF THE INVENTION

1. Field of the Invention

The present invention relates to a Faraday rotator formed of a bismuth-substituted rare earth-iron-garnet single crystal and capable of reversibly controlling the plane of polarization through it, and relates to an optical device that comprises it (e.g., optical isolator, optical circulator, optical switch, optical attenuator, polarization controller).

The invention also relates to an antireflection film formed on the surface of a Bi-substituted rare earth-iron-garnet material to be used for such a Faraday rotator, and to an optical device that comprises it.

2. Description of the Related Art

First Related Art:

A Bi-substituted rare earth-iron-garnet film that has grown in a mode of liquid-phase epitaxial (LPE) growth has heretofore been much used for Faraday rotators for optical isolators in optical communication systems. Apart from their application to such optical isolators, in addition, Faraday rotators are being utilized these days also for magneto-optic-type optical attenuators, optical switches and polarization controllers in WDM (wavelength division multiplexing) systems (for example, see JP-A 6-51255).

In an optical isolator, an external magnetic field is applied to the Faraday rotator or the Faraday rotator itself is a permanent magnet. In driving such an optical isolator, the light traveling direction and the magnetic moment direction therein are controlled to be almost the same to thereby produce a predetermined Faraday rotation angle.

On the other hand, in other optical devices having a Faraday rotator such as magneto-optic-type attenuators, an external magnetic field H that is opposite to the light-traveling direction therein is applied to the Faraday rotator in order that the resulting Faraday rotation angle may be reversibly changed.

In that case, the intensity of the external magnetic field H to be applied to the Faraday rotator is controlled to be comparable to or larger than that of the saturation magnetic field Hs of the Faraday rotator to thereby reduce the light diffraction loss to be caused by the magnetic domain structure of the Faraday rotator. When the crystal for a Faraday rotator is grown in a mode of liquid-phase epitaxial growth, it receives magnetic anisotropy in the growing direction (growth-induced magnetic anisotropy), and this produces an axis of easy magnetization (easy axis) in the crystal-growing direction in which, therefore, the Faraday rotator formed of the crystal is easily magnetized. Accordingly, regarding a Faraday rotator of a type of which the light-incident surface is almost perpendicular to the crystal-growing direction and which is not subjected to heat treatment, even when an external magnetic field H is applied to it in the direction that is oblique to the light-input surface thereof, the magnetic moment orientation of the resulting Faraday rotator does not almost shift from the crystal-growing direction thereof.

Given that situation, a Faraday rotator is heated at a high temperature of around 1000° C. so as to reduce the growth-induced magnetic anisotropy thereof. Then, its easy axis is not in the direction of <111> that is the same as the crystal-growing direction but is in a different direction of <111> that is nearer to the plane direction of the growth surface owing to the effect of the shape magnetic anisotropy of the crystal that forms the Faraday rotator. As in FIG. 24, there are four <111> directions on a substrate. The first direction is a <111> direction a that is perpendicular to the substrate surface; and the remaining three directions <111> β1, β2 and β3 each have an angle of about 20° from the substrate surface. From the <111> direction α, the angle between β1 and β2, that between β2 and β3 and that between β3 and β1 are all 120°. When the growth-induced magnetic anisotropy reduces, then the magnetic moment direction is readily oriented toward the direction that is parallel to the substrate surface due to the formed effect of an epitaxial film growing in a disk style. Therefore, the magnetic moment orientation shall be in the three directions β1, β2 and β3 that are the nearest to the direction parallel to the substrate surface. Accordingly, it is possible to change the magnetic moment direction of the Faraday rotator in accordance with the direction in which the external magnetic field H that is higher than the saturation magnetic field Hs is applied to the Faraday rotator, and the rotation angle of the Faraday rotator is thereby changeable.

FIG. 8 is a graph showing the relationship between the external magnetic field H applied to a Faraday rotator and the Faraday rotation angle. In this, the horizontal axis indicates the external magnetic field H (Oe); and the vertical axis indicates the Faraday rotation angle (deg.). The curve a shows the Faraday rotation angle of a heat-treated Faraday rotator in an external magnetic field H; and the curve β shows the Faraday rotation angle of a non-heated Faraday rotator in the same external magnetic field H. The value Hsβ on the horizontal axis indicates the intensity of the saturation magnetic field Hs of the non-heated Faraday rotator; and the value Hsα thereon indicates the intensity of the saturation magnetic field Hs of the heat-treated Faraday rotator. In the case of FIG. 8, the external magnetic field H is applied to the Faraday rotator in the direction in which the garnet single crystal to form the Faraday rotator has grown, and this is in the direction in which light enters or goes out of the Faraday rotator.

With the growth-induced magnetic anisotropy decreasing, the magnetic moment orientation may shift more easily in any desired direction in accordance with the change of the direction of the external magnetic field H. Heated at a higher temperature for a longer period of time, crystals more readily undergo atomic rearrangement therein, and their growth-induced magnetic anisotropy reduces more. On the other hand, however, their saturation magnetic field Hs increases more. As a result, therefore, the saturation magnetic field Hsα of the Faraday rotator, which was heated to reduce the growth-induced magnetic anisotropy thereof, is significantly larger than the saturation magnetic field Hsβ of the non-heated Faraday rotator, as in FIG. 8.

For the reasons as above, the magnet (permanent magnet or electromagnet) that generates the external magnetic field H enough to saturate the Faraday rotator shall be large-sized. In addition, the electromagnet that generates the variable magnetic field to constitute the synthetic magnetic field, which is for changing the Faraday rotation angle, shall be also large-sized, and, as a result, a large current must be flowed to the coil of the electromagnet. This brings about some problems in that the optical devices that comprise the Faraday rotator and the magnetic circuit for it are inevitably large-sized and their production costs increase. Another problem with the Faraday rotator of the type is that, if the Faraday rotator is poorly heat-treated, it still has the growth-induced magnetic anisotropy remaining therein and, if so, its magnetic moment orientation does not move even when the direction of the external magnetic field H applied thereto is changed, and therefore the Faraday rotation angle does not change satisfactorily.

In this description, the uppermost limit of the magnetic field that does no more increase the Faraday rotation angle of a Faraday rotator even though the intensity of the magnetic field applied to the Faraday rotator is further increased is referred to as the saturation magnetic field Hs of the Faraday rotator.

Second Related Art:

As so mentioned hereinabove, the Bi-substituted rare earth-iron-garnet single-crystal film that has grown in a mode of liquid-phase epitaxial growth shall undergo growth-induced magnetic an isotropy in the film-growing direction. Accordingly, the magnetic moment orientation of the garnet single-crystal film is fixed to be the same as the epitaxial growth direction. In general, the Faraday rotator to be used in optical isolators is so designed that its magnetic moment orientation shall be the same as the epitaxial growth direction of the garnet single-crystal film that forms it. Accordingly, for the Faraday rotator for that use, the characteristic magnetic property of the epitaxially-grown garnet single-crystal film causes no problem in practical use.

Contrary to this, however, for the Faraday rotator to be in variable optical attenuators in which the Faraday rotation angle shall be variable, the garnet single-crystal film must be so processed that its magnetic moment orientation is inclined relative to the epitaxial growth direction of the garnet single-crystal film. For this, a magnetic field is applied to the garnet single-crystal film in the direction that differs from the epitaxial growth direction of the garnet single-crystal film. In this case, strong growth-induced magnetic anisotropy, if any, of the garnet single-crystal film will be a bar to the intended change of the magnetic moment orientation of the film in the inclined direction. Accordingly, the Bi-substituted rare earth-iron-garnet single-crystal film is heated at a high temperature not lower than 1000° C. to thereby weaken the growth-induced magnetic anisotropy thereof in order that the magnetic moment direction of the thus-heated film could be oriented to the direction of the magnetic field applied to the film and therefore the Faraday rotation angle of the Faraday rotator formed of the film could be variable (for example, see JP-A 10-1398).

When the growth-induced magnetic anisotropy of the heat-treated garnet single-crystal film is weakened, the magnetic moment direction of the film is readily oriented in the direction except the film growth direction, or that is, it is hardly oriented in the film growth direction. Accordingly, the saturation magnetic field Hs in the film growth direction of the garnet single-crystal film is larger after heat treatment of the film than before heat treatment thereof. With the intensity of the magnetic field applied to the film in the film growth direction being gradually increased from 0, the Faraday rotation angle of the Faraday rotator formed of the film is measured, and the magnetic field in which the Faraday rotation angle no more changes is referred to as the saturation magnetic field Hs. FIG. 2 shows the condition of a Faraday rotator 1 that has received an external magnetic field H (not shown) lower than the saturation magnetic field Hs thereof in the direction almost perpendicular to the light-input surface of the Faraday rotator 1. As in FIG. 2, a part of the magnetic moment 2 of the Faraday rotator 1 is directed toward the direction of the magnetic field applied to the Faraday rotator 1, while the other thereof is opposite to it. Therefore, in this condition, the garnet single-crystal film that forms the Faraday rotator 1 shall have a different magnetic domain structure.

When a specifically polarized light Ii is incident to the Faraday rotator 1 that is in an external magnetic field H lower than the saturation magnetic field Hs thereof, then it is further polarized differently in the region of the Faraday rotator in which the direction of the magnetic moment 2 thereof is opposite to each other. As a result, the light having entered the Faraday rotator 1 is diffracted to scatter therein to give diffracted light Ir, and therefore the output light Io is thereby reduced, as shown in FIG. 2. This is light loss through the Faraday rotator 1, and this increases the light loss in optical devices that comprise the Faraday rotator 1.

Accordingly, the condition for the heat treatment of the garnet single-crystal film for weakening the growth-induced magnetic anisotropy thereof must be so controlled that the direction of the magnetic moment 2 of the heated film may become readily changed when the film has received an external magnetic field H applied thereto and, in addition, the saturation magnetic field Hs of the film does not increase as much as possible. However, the Faraday rotator that has been heat-treated in the thus-controlled condition to satisfy the requirement will come up against a problem in that the Faraday rotation angle could not accurately vary within a desired range. This is because of the reduction in the magnetic moment orientation reproducibility of the Faraday rotator to which is applied a magnetic field for orienting the magnetic moment direction thereof toward the direction of the magnetic field applied thereto. This problem after all leads to another problem in that magneto-optic-type optical attenuators that comprise the Faraday rotator of the type could not enjoy satisfactory attenuation.

Third Related Art:

An antireflection film is an optical thin film formed on the surface of an optical device via which light goes in or goes out of the structure, and it acts to prevent light reflection on the interface between the optical device and a substance of which the refractive index differs from that of the optical device.

In various optical devices used in optical communication systems, such an antireflection film is formed in the interface through which light runs therein, and it acts to prevent light from reflecting thereon to thereby reduce the returning light. Also in the Faraday rotator that is used for optical isolators or optical attenuators which are passive devices in optical communication systems, an antireflection film is formed on both surfaces thereof through which light goes in or goes out of it. With the antireflection film of the type, the Faraday rotator is built in the intended devices. In the Faraday rotator, concretely, such an antireflection film is formed in the interface between the magnetic garnet, or that is, the constitutive material of the Faraday rotator and air, or in the interface between the magnetic garnet and an epoxy resin. In the latter, the epoxy resin is used for bonding the Faraday rotator to any other optical device, and light runs through the bonding interface of the two.

In general, such an antireflection film is composed of thin films of materials of different refractivity that are formed through vapor deposition, for example, as in JP-A4-230701. Some conventional antireflection films are specifically so designed that they have a lowered refractive index selectively to light of a specific wavelength, for example, a wavelength λ of 1310 nm or 1550 nm in optical communication systems.

With the drastic increase in communication data of these days, wavelength division multiplexing (WDM) systems are now employed in the recent optical communication technology, in which multiple wavelengths λ of light are used for the purpose of remarkably increasing the communication capacity in the optical communication systems. In the wavelength division multiplexing systems light of different wavelengths diffuses in a wide area and passes through optical fibers and passive devices, as compared with light of a single wavelength in ordinary optical communication systems. According to the current optical communication technology, however, the Faraday rotator having, for example, a Faraday rotation angle of 45 degrees relative to the light having a wavelength of 1550 nm is worked to have an antireflection film of low reflectivity for the single wavelength light of 1550 nm. Having the antireflection film of the type, therefore, the Faraday rotator is unsatisfactory in point of the antireflection to any other light than the light of 1550 nm. Therefore, this causes a problem in that the light except 1550 nm is reflected on the light-input surface of the Faraday rotator to form a returning light and the insertion loss of the Faraday rotator therefore increases.

Multiple wavelengths are used in the wavelength division multiplex system, and the Faraday rotators to be used for their light sources are so designed that their rotation angle to the wavelength specifically defined for them should be 45 degrees. In this connection, the characteristic property of magnetic garnet for such Faraday rotators must be taken into consideration. Specifically, the Faraday rotation angle of magnetic garnet varies depending on the wavelength of light that enters it. Therefore, different Faraday rotators each satisfying the rotation angle of 45 degrees for the intended different wavelengths must be fabricated for the wavelength division multiplex system. For this, in conventional vapor deposition of forming antireflection films, the optimum antireflection films for the intended different wavelengths are formed for all Faraday rotators that are fabricated for different wavelengths. The antireflection films are formed in a batch process of vapor deposition such as vacuum evaporation or the like, and the increase in the number of the wavelengths for the antireflection films to be formed through such vapor deposition inevitably results in the increase in the number of the film-forming operations. This is problematic in that the process of forming the antireflection films is complicated and its productivity lowers.

SUMMARY OF THE INVENTION

One object of the present invention is to provide an optical device which is applicable to a small-sized and power-saving magnetic circuit and in which the insertion loss of a Faraday rotator may be reduced.

Another object of the invention is to provide a Faraday rotator formed of a Bi-substituted rare earth-iron-garnet single-crystal film, of which the advantages are that even though the single-crystal film is subjected to heat treatment for weakening its growth-induced magnetic anisotropy, its Faraday rotation angle is stably and widely variable, and to provide an optical device that comprises the Faraday rotator.

Still another object of the invention is to provide an antireflection film that ensures low reflectivity in a wide area and can be readily formed at low costs, and to provide an optical device that comprises the antireflection film.

The first object mentioned above can be attained by an optical device that comprises a Faraday rotator formed of a garnet single crystal and a magnetic circuit for applying an external magnetic field H which is smaller than the saturation magnetic field Hs of the Faraday rotator to the Faraday rotator.

In the optical device of the invention, the garnet single crystal is represented by $Bi_aA_{3-a}Fe_{5-x}M_xO_{12}$ wherein A is at least one element of Y, Lu, Yb, Er, Ho, Dy, Tb, Gd, Eu, Sm, Nd, Pr, Ce, La, Pb and Ca; a satisfies $0.6 \leq a \leq 2.0$; M is at least one element of Ga, Al, Sc, In, Si, Ge, Ti, Au, Ir and Pt; x satisfies $0 \leq x \leq 1.5$.

In the optical device of the invention, the garnet single crystal is represented by $Bi_bA_cB_{3-b-c}Fe_{5-x}M_xO_{12}$ wherein A is at least one element of Y, Lu, Yb, Er, Ho, Eu, Sm, Nd, Pr, Ce, La, Pb and Ca; B is at least one element of Tb, Gd and Dy; b and c satisfy $0.6 \leq b \leq 2.0$ and $0.6 < b+c \leq 3.0$; M is at least one element of Ga, Al, Sc, In, Si, Ge, Ti, Au, Ir and Pt; and x satisfies $0 \leq x \leq 1.5$.

In the optical device of the invention, the external magnetic field H to be applied by the magnetic circuit is within a range of $0.4 \times |Hs| < |H| < |Hs|$ wherein $|H|$ indicates the intensity of the external magnetic field H and $|Hs|$ indicates the intensity of the saturation magnetic field Hs.

In the optical device of the invention, the magnetic circuit applies the external magnetic field H in the direction oblique to the light-input surface of the Faraday rotator.

In the optical device of the invention, the external magnetic field H applied by the magnetic circuit to the Faraday rotator is a combination of multiple magnetic fields.

The second object mentioned above can be attained by a Faraday rotator which is formed of a garnet single crystal and which satisfies the requirement of $1 > F/Fs \geq 0.96$ wherein Fs indicates the saturation rotation angle of the rotator having received the saturation magnetic field Hs thereof in the direction almost perpendicular to the light-input surface of the garnet single crystal and F indicates the Faraday rotation angle of the rotator having received an external magnetic field H of 0.9 times the saturation magnetic field Hs.

In the Faraday rotator of the invention, the garnet single crystal is represented by $Bi_aA_{3-a}Fe_{5-x}M_xO_{12}$ wherein A is at least one element of Y, Lu, Yb, Er, Ho, Dy, Tb, Gd, Eu, Sm, Nd, Pr, Ce, La, Pb and Ca; a satisfies $0.6 \leq a \leq 2.0$; M is at least one element of Ga, Al, Sc, In, Si, Ge, Ti, Au, Ir and Pt; x satisfies $0 \leq x \leq 1.5$.

In the Faraday rotator of the invention, the garnet single crystal is represented by $Bi_bA_cB_{3-b-c}Fe_{5-x}M_xO_{12}$ wherein A is at least one element of Y, Lu, Yb, Er, Ho, Eu, Sm, Nd, Pr, Ce, La, Pb and Ca; B is at least one element of Tb, Gd and Dy; b and c satisfy $0.6 \leq b \leq 2.0$ and $0.6 < b+c \leq 3.0$; M is at least one element of Ga, Al, Sc, In, Si, Ge, Ti, Au, Ir and Pt; and x satisfies $0 \leq x \leq 1.5$.

Of the Faraday rotator of the invention, the Faraday rotation angle F can be varied by controlling the external magnetic field H to be applied thereto.

The object can also be attained by an optical device that comprises the Faraday rotator as above and a magnetic circuit for applying the external magnetic field H to the Faraday rotator.

The third object mentioned above can be attained by an antireflection film of a first $Ta_2O_5$ layer that satisfies $0.17 \leq nd/\lambda \leq 0.80$, a first $SiO_2$ layer that satisfies $0.02 \leq nd/\lambda \leq 0.54$, a second $Ta_2O_5$ layer that satisfies $0.16 \leq nd/\lambda \leq 0.38$ and a second $SiO_2$ layer that satisfies $0.20 \leq nd/\lambda \leq 0.29$, formed in that order on the surface of a substrate, wherein $\lambda$ indicates the wavelength of the transmitted light, n indicates the refractive index of each layer and d indicates the thickness of each layer.

The antireflection film of the invention has an opposite surface which is opposed to the surface of the substrate and faces air.

The antireflection film of the invention is so designed that its reflectivity is at most 0.1% in the wavelength range of $\lambda +/- 70$ nm around the wavelength $\lambda$ of the transmitted light.

For the antireflection film of the invention, the wavelength $\lambda$ is in the range of 1310 nm$\leq\lambda\leq$1750 nm.

The object can also be attained by an optical device which comprises a garnet single crystal and in which the light-input surface and the light-output surface of the garnet single crystal are coated with the antireflection film.

In the optical device of the invention, the garnet single crystal is represented by $Bi_aA_{3-a}Fe_{5-x}M_xO_{12}$ wherein A is at least one element of Y, Lu, Yb, Er, Ho, Dy, Tb, Gd, Eu, Sm, Nd, Pr, Ce, La, Pb and Ca; M is at least one element of Ga, Al, Sc, In, Si, Ge, T1, Au and Ir; a and x satisfy $1.0\leq a\leq 2.4$ and $0\leq x\leq 1.5$.

In the optical device of the invention, the garnet single crystal is represented by $Bi_aA_bB_{3-a-b}Fe_{5-x}M_xO_{12}$ wherein A is at least one element of Er, Dy, Tb, Sm, Nd and Pr; B is at least one element of Y, Lu, Yb, Ho, Gd, Ce, La, Pb and Ca; M is at least one element of Ga, Al, Sc, In, Si, Ge, Ti, Au and Ir; and a, b and x satisfy $1.0\leq a\leq 2.4$, $0\leq b\leq 0.1$, and $0<x\leq 1.5$.

The optical device of the invention is so designed that its reflectivity is at most 0.1% in the overall wavelength range of 1460 nm$\leq\lambda\leq$1530 nm wherein $\lambda$ indicates the wavelength of light.

The optical device of the invention is so designed that its reflectivity is at most 0.1% in the overall wavelength range of 1530 nm$\leq\lambda\leq$1565 nm wherein $\lambda$ indicates the wavelength of light.

The optical device of the invention is so designed that its reflectivity is at most 0.1% in the overall wavelength range of 1565 nm$\leq\lambda\leq$1625 nm wherein $\lambda$ indicates the wavelength of light.

In the optical device of the invention, the garnet single crystal forms a Faraday rotator.

The object can also be attained by an optical isolator which comprises a Faraday rotator with an antireflection film formed on its light-input/light-output surfaces and in which the antireflection film is the antireflection film of the invention mentioned above.

The object can also be attained by an optical attenuator which comprises a Faraday rotator with an antireflection film formed on its light-input/light-output surfaces and in which the antireflection film is the antireflection film of the invention mentioned above.

DESCRIPTION OF THE PREFERRED EMBODIMENTS

Figure 1:
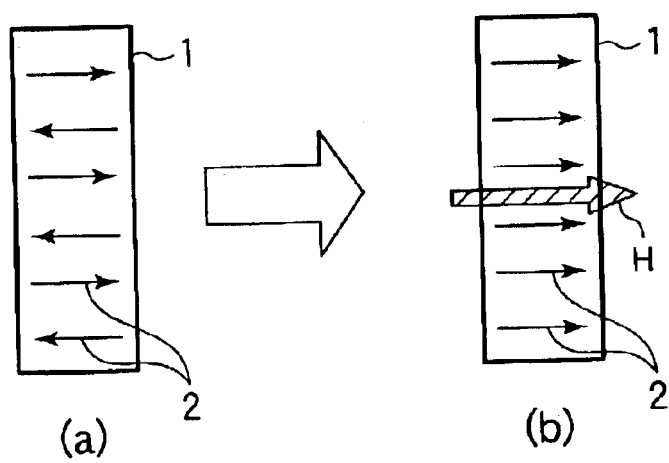
FIG. 1 is a view for explaining the operation principle of the optical device of the first embodiment of the invention, and this shows the relationship between the direction of the magnetic moment of the optical device illustrated and the intensity of the external magnetic field H applied to the optical device.
Figure 2:
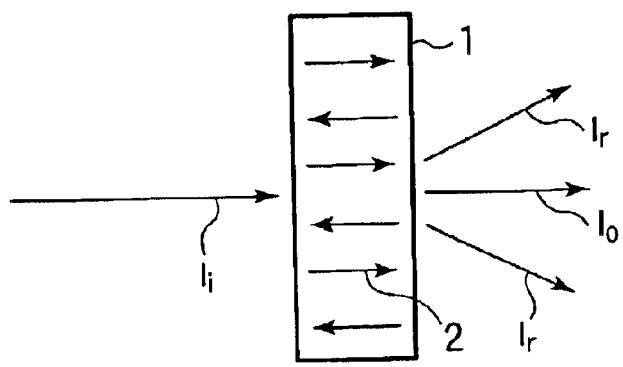
FIG. 2 is a view for explaining the operation principle of the optical device of the first embodiment of the invention, and this shows the relationship between the direction of the magnetic moment of the optical device illustrated and the light loss caused by the diffracted light through the optical device.

First Embodiment of the Invention:

The optical device of the first embodiment of the invention is described with reference to FIG. 1 to FIG. 7. First referred to are FIG. 1 to FIG. 4 for describing the operation principle of the optical device of this embodiment. FIG. 1 shows the relationship between the direction of the magnetic moment of the optical device illustrated and the intensity of the external magnetic field H applied to the optical device, and FIG. 2 shows the relationship between the direction of the magnetic moment of the optical device illustrated and the light loss caused by the diffracted light through the optical device. FIG. 1 and FIG. 2 both show a Faraday rotator 1 not subjected to heat treatment. The light-input surface of the Faraday rotator 1 is almost perpendicular to the crystal growth direction of the garnet single crystal that forms the rotator.

As in FIG. 1A, the easy axis of the garnet single crystal that forms the non-heated Faraday rotator 1 is in the crystal growth direction. Therefore, some of the magnetic moment 2 in the Faraday rotator 1 with no magnetic field applied thereto is in one direction that is parallel to the easy axis, while the other is in the opposite direction, and the rotator 1 shall therefore have a non-uniform magnetic domain structure.

Figure 3:
FIG. 3 is a micrographic photograph showing the magnetic domain structure of a Faraday rotator not subjected to heat treatment.

As in FIG. 1B, when an external magnetic field H that is larger than the saturation magnetic field Hs thereof is applied to the Faraday rotator 1, then the magnetic moment 2 of the rotator 1 is in one direction in the entire region thereof, and the magnetic domain structure 1 is uniform in the rotator 1. For example, when a light Ii having a wavelength of 1550 nm that is used in optical communication is applied to the Faraday rotator 1 in this condition, there occurs no light loss (insertion loss) to be caused by the magnetic domain structure in the rotator 1. However, when an external magnetic field H lower than the saturation magnetic field Hs thereof is applied to the rotator 1, then a part of the magnetic moment 2 of the rotator 1 is in the direction of the magnetic field but the other thereof is in the opposite direction, and therefore the rotator 1 shall have a non-uniform magnetic domain structure therein, as in FIG. 2. FIG. 3 is a microscopic photograph that shows the magnetic domain structure of the Faraday rotator 1 not subjected to heat treatment. As in FIG. 3, the magnetic domain structure of the Faraday rotator 1 has a lattice-like pattern. With no magnetic field applied thereto, a straight polarized light was made to enter the Faraday rotator 1, and the light having gone out of the rotator 1 was observed through a polarizer. The magnification is ×50. When a specific polarized light Ii is made to enter the Faraday rotator 1 in that condition, then it is further polarized differently in the-region where the magnetic moment 2 is in the light-running direction and in the other region where the magnetic moment 2 is in the opposite direction. As a result, therefore, the light having entered the rotator 1 is diffracted to scatter therein to give diffracted light Ir, and therefore the output light Io is thereby reduced, as in FIG. 2. This is light loss through the Faraday rotator 1.

Figure 4:
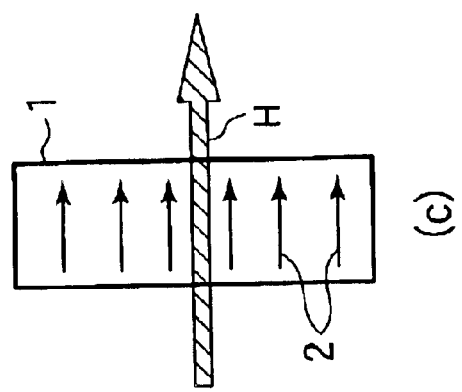
FIG. 4 is a view for explaining the relationship between the direction of the magnetic moment of a heat-treated Faraday rotator 1 and the intensity of the external magnetic field H applied to the rotator 1.
Figure 4:
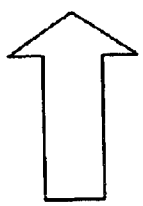
Figure 4:
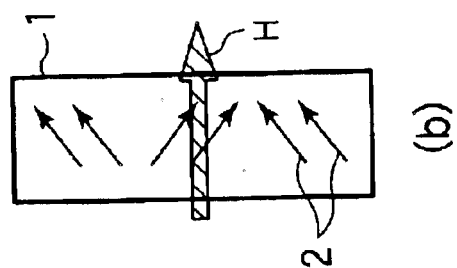
Figure 4:
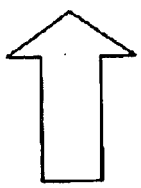
Figure 4:
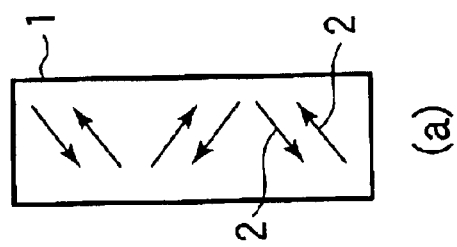

FIG. 4 is a view for explaining the relationship between the direction of the magnetic moment of a heat-treated Faraday rotator 1 and the intensity of the external magnetic field H applied to the rotator 1. The light-input surface of the Faraday rotator 1 is almost perpendicular to the crystal growth direction of the garnet single crystal that forms the rotator 1.

Of the garnet single crystal that forms the heat-treated Faraday rotator 1, the easy axis is shifted from the <111> direction that is the same as the crystal growth direction to the other <111> direction nearer to the surface of the grown crystal. With no magnetic field applied thereto, however, some of the magnetic moment 2 in the Faraday rotator 1 is in one direction parallel to the easy axis but the other thereof is in the opposite direction, as in FIG. 4A, and the rotator 1 has a non-uniform magnetic domain structure formed therein.

When an external magnetic field H larger than the saturation magnetic field Hs thereof is applied to the heat-treated Faraday rotator 1, then the magnetic moment 2 thereof is in one direction like that of the non-heated Faraday rotator, as in FIG. 4C, and the rotator 1 has a uniform magnetic domain structure therein with no light loss through it.

As opposed to this, when an external magnetic field H smaller by a predetermined level than the saturation magnetic field Hs thereof is applied to the heat-treated Faraday rotator 1, then the magnetic moment 2 thereof is almost in the direction near to the direction of the external magnetic field H, as in FIG. 4B. This is because the Faraday rotator 1 has lost the growth-induced magnetic anisotropy, and, in that condition, it does not have a definitely differentiated magnetic domain structure. As a result, even when such an external magnetic filed H smaller than the saturation magnetic field Hs thereof is applied to the Faraday rotator 1 in that condition, little light diffraction will occur in the rotator 1 and the rotator 1 is therefore almost free from light loss through it. However, even the heat-treated Faraday rotator 1 will undergo light loss to be caused by light diffraction therethrough if the external magnetic field H is smaller than a predetermined level. This is because the non-uniformity of the magnetic domain structure in the rotator 1 in that condition is definite.

Figure 8:
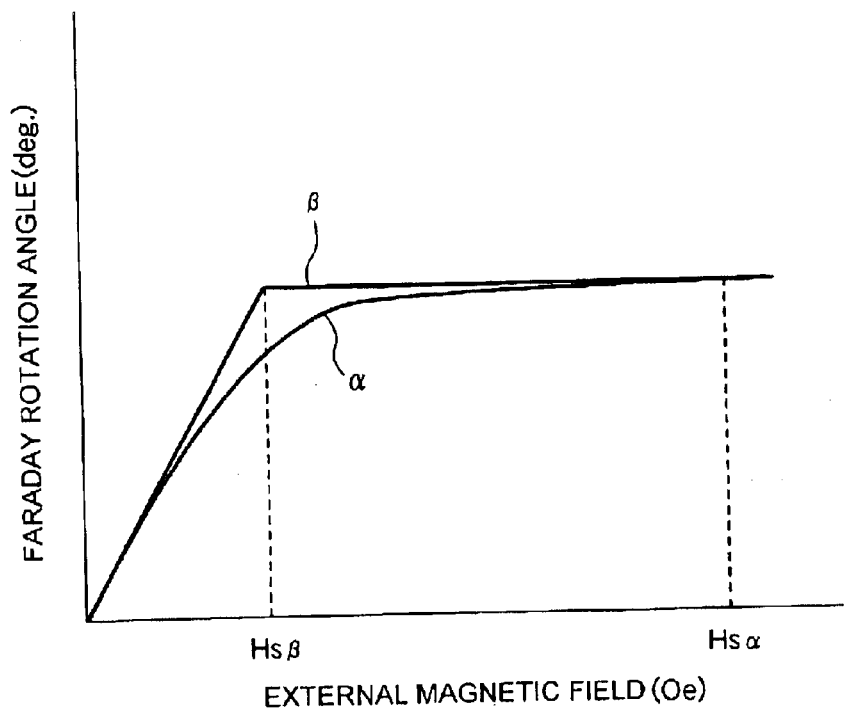
FIG. 8 is a graph showing the relationship between the external magnetic field H applied to a Faraday rotator and the Faraday rotation angle of the rotator.

As so described hereinabove with reference to FIG. 8, when a Faraday rotator is heat-treated for removing its growth-induced magnetic anisotropy, then its saturation magnetic field Hs increases. However, as also mentioned so hereinabove, even when an external magnetic field H that is smaller by a predetermined level than the saturation magnetic field Hs thereof is applied to such a heat-treated Faraday rotator, the light loss through the rotator is not so large and will be negligible in practical use of the device that comprises the rotator. To that effect, when the Faraday rotation angle of a Faraday rotator is controlled by applying thereto an external magnetic field H smaller than the saturation magnetic field Hs thereof, then the magnetic circuit to generate the necessary magnetic field for the rotator may be small-sized and the current to be consumed by the electromagnet for the rotator may be reduced. As a result, it is possible to fabricate small-sized and power-saving optical devices that comprise the thus-controlled Faraday rotator and magnetic circuit.

Figure 5:
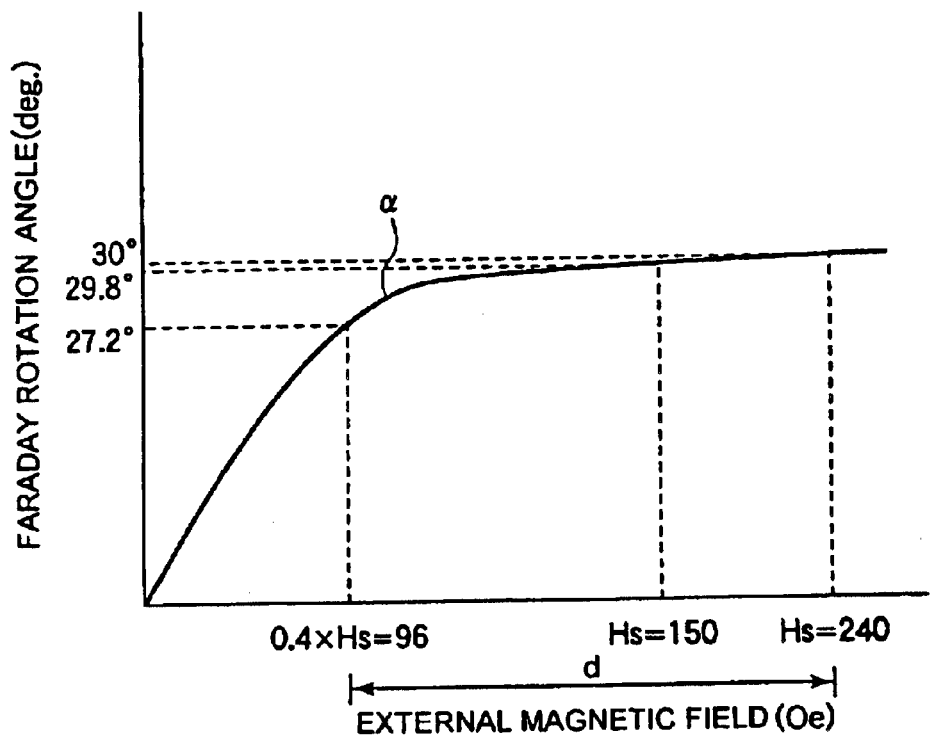
FIG. 5 is a graph showing the relationship between the external magnetic field H applied to a heat-treated Faraday rotator 1 and the Faraday rotation angle of the rotator 1.

FIG. 5 is a graph showing the relationship between the external magnetic field H applied to a heat-treated Faraday rotator 1 and the Faraday rotation angle of the rotator 1. In this, the curve α is the same as that in FIG. 8. The horizontal axis of the graph indicates the external magnetic field H (Oe) and the vertical axis thereof indicates the Faraday rotation angle (deg.) of the rotator. The value Hs on the horizontal axis indicates the intensity of the saturation magnetic field Hs of the heat-treated Faraday rotator. The value, 0.4×Hs also on the horizontal axis indicates almost 40% of the saturation magnetic field Hs. To give the data as in FIG. 5, the direction of the external magnetic field H applied to the Faraday rotator is parallel to the crystal growth direction of the garnet single crystal to form the rotator and is parallel to the light-traveling direction through the rotator.

As in FIG. 5 that shows the experimental data, the magnetic domain structure non-uniformity in the heat-treated Faraday rotator 1 becomes definite when the intensity of the external magnetic field H applied to the rotator 1 is lower than about 40% of the saturation magnetic field Hs of the rotator 1. In that condition, the light loss owing to light diffraction in the rotator 1 increases, and the practical use of the rotator 1 in optical devices is problematic. Accordingly, when an external magnetic field H is applied to a Faraday rotator in the light-entering direction thereof and when the intensity of the saturation magnetic field Hs of the Faraday rotator 1 is indicated by |Hs| and the intensity of the external magnetic field H is by |H|, then it is desirable that |H| is smaller than and is at least 40% of |Hs|. Specifically, it is desirable that the intensity |H| of the external magnetic field H to be applied to the heat-treated Faraday rotator 1 falls within the range of d indicated by the arrow in FIG. 5. When the external magnetic field H, of which the intensity is about 40% of the saturation magnetic field Hs thereof, is applied to the heat-treated Faraday rotator 1 in the light-entering direction thereof, then the magnetic moment 2 in the rotator 1 is oriented almost in the direction of the magnetic field, and the Faraday rotation angle of the rotator 1 reaches about 90% of the rotation angle thereof having received its saturation magnetic field Hs. In that condition, the rotator 1 does not have a definite non-uniform magnetic domain structure and its light loss is not so great.

One example of the garnet single crystal to form the Faraday rotator 1 is represented by $Bi_aA_{3-a}Fe_{5-x}M_xO_{12}$ wherein A is at least one element of Y, Lu, Yb, Er, Ho, Dy, Tb, Gd, Eu, Sm, Nd, Pr, Ce, La, Pb and Ca; a satisfies $0.6 \leq a \leq 2.0$; M is at least one element of Ga, Al, Sc, In, Si, Ge, Ti, Au, Ir and Pt; x satisfies $0 \leq x \leq 1.5$.

Another example of the garnet single crystal to form the Faraday rotator 1 is represented by $Bi_bA_cB_{3-b-c}Fe_{5-x}M_xO_{12}$ wherein A is at least one element of Y, Lu, Yb, Er, Ho, Eu, Sm, Nd, Pr, Ce, La, Pb and Ca; B is at least one element of Tb, Gd and Dy; b and c satisfy $0.6 \leq b \leq 2.0$ and $0.6 \leq b+c \leq 3.0$; M is at least one element of Ga, Al, Sc, In, Si, Ge, Ti, Au, Ir and Pt; and x satisfies $0 \leq x \leq 1.5$.

One advantage of magnetic garnet that contains any of Gd, Tb or Dy as the essential rare earth element therein is that its saturation magnetic field Hs is reduced, and the rotator formed of the magnetic garnet of the type may be driven even with small-sized and power-saving magnetic circuits. The effect is more significant when the chemical formula that represents the magnetic garnet satisfies the requirement of $0 < 3-b-c \leq 2.4$.

Regarding the Bi content of the magnetic garnet, if a or b that indicates the Bi content is less than 0.6, the Faraday rotation coefficient (rotation angle/thickness of rotator) of the Faraday rotator formed of the magnetic garnet will be low and the thickness of the rotator to attain the predetermined Faraday rotation angle shall increase, and, if so, the garnet single-crystal film for the rotator is difficult to grow. On the other hand, if a or b that indicates the Bi content of the magnetic garnet is more than 2.0, the crystal growing condition in epitaxial growth of the garnet single-crystal film will be unstable and single-crystal films of good quality could not be obtained. For these reasons, the Bi content of the magnetic garnet to form the Faraday rotator preferably satisfies the condition of $0.6 \leq a \leq 2.0$ or $0.6 \leq b \leq 2.0$ in the above-mentioned chemical formulae that show the magnetic garnet.

In the chemical formulae, M is the element substitutable for Fe The element M, if any, in the magnetic garnet reduces the saturation magnetic field Hs of the Faraday rotator formed of the magnetic garnet. However, if the content of the element M indicated by x to be substituted for Fe is more than 1.5 in the chemical formulae, the Curie point of the magnetic garnet will be lower than the operation temperature (for example, room temperature of about 25° C.) of the Faraday rotator formed of such magnetic garnet, and, if so, the Faraday rotator is no more functional. Accordingly, the M content of the magnetic garnet preferably satisfies $0 \leq x \leq 1.5$.

This embodiment of the invention is summarized as follows: When light is inputted into a Faraday rotator 1 in which the direction of the magnetic moment 2 is variable and when the direction and the intensity of the external magnetic field H applied to the Faraday rotator 1 are varied, then the Faraday rotation angle at the polarization plane of the rotator 1 varies in accordance with the variations of the external magnetic field H. This realizes a rotation angle-variable Faraday rotator 1. When the intensity of the saturation magnetic field Hs of the Faraday rotator 1 of the type combined with a magnetic circuit is indicated by |Hs|, it is desirable that the intensity |H| of the external magnetic field H to be applied to the Faraday rotator 1 satisfies the requirement of $0.4 \times |Hs| < |H| < |Hs|$. In that condition, the magnetic circuit to be combined with the Faraday rotator 1 may be small-sized and the power to be consumed by it may be reduced. Another advantage of the combination is that the light loss through the Faraday rotator 1 is reduced. The Faraday rotator of this embodiment of the invention enjoys the effect not only when it is driven in a composite magnetic field of two magnetic fields but also in a single magnetic field that is oriented differently from the light-traveling direction in the Faraday rotator.

The invention of this embodiment is described more concretely with reference to the following Examples.

EXAMPLE 1-1

A magnetic garnet single-crystal film having a composition of $Bi_{1.2}Gd_{1.2}Yb_{0.5}Pb_{0.05}Fe_{4.15}Ga_{0.8}Pt_{0.01}Ge_{0.04}O_{12}$ was grown in a mode of liquid-phase epitaxial growth, and worked into a magnetic garnet single-crystal plate. With varying its intensity, an external magnetic field H was applied to the thus-fabricated single-crystal plate substrate in the direction perpendicular to the substrate surface, and the Faraday rotation angle of the plate substrate was measured. The uppermost limit of the magnetic field H that did no more increase the Faraday rotation angle of the sample tested herein even though the intensity of the magnetic field H applied thereto was further increased is the saturation magnetic field Hs of the sample. To that effect, the intensity |Hs| of the saturation magnetic field Hs of this sample was measured at room temperature, and |Hs|=110 Oe.

The single-crystal substrate was heat-treated at 1100° C. for 30 hours, and its saturation magnetic field Hs was measured at room temperature in the same manner as above.

As in FIG. 5, its |Hs|=240 Oe. The heat-treated garnet single crystal was further worked. Concretely, this was coated with an antireflection film (AR coat layer) in a mode of vapor deposition on both of the light-input surface and the light-output surface thereof. Thus fabricated, this is a Faraday rotator 1. To the Faraday rotator 1, applied was an external magnetic field H of which the intensity is the same as that of the saturation magnetic field Hs, |Hs|=240 Oe, in the direction in which light travels through the rotator 1, and the light insertion loss was measured. The insertion loss was 0.03 dB, and the Faraday rotation angle was 30 degrees (see FIG. 5). The intensity of the external magnetic field H applied to the rotator 1 was changed to 150 Oe, and the insertion loss was measured in the same manner as above. The insertion loss was 0.05 dB, and the Faraday rotation angle was 29.8 degrees (see FIG. 5). The intensity of the external magnetic field H applied to the rotator 1 was further changed to 96 Oe, and the insertion loss was measured in the same manner as above. The insertion loss was 0.20 dB, and the Faraday rotation angle was 27.2 degrees (see FIG. 5). The insertion loss up to this level causes no problem in practical operation of the optical device that comprises the Faraday rotator 1 of this Example.

Figure 6:
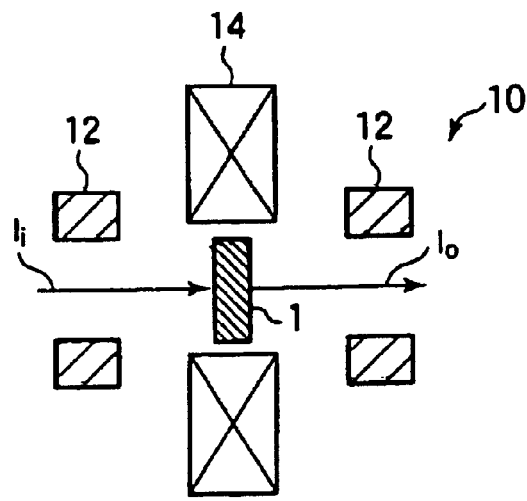
FIG. 6 is a view showing the outline of the optical device of Example 1-1 of the first embodiment of the invention.
Figure 7:
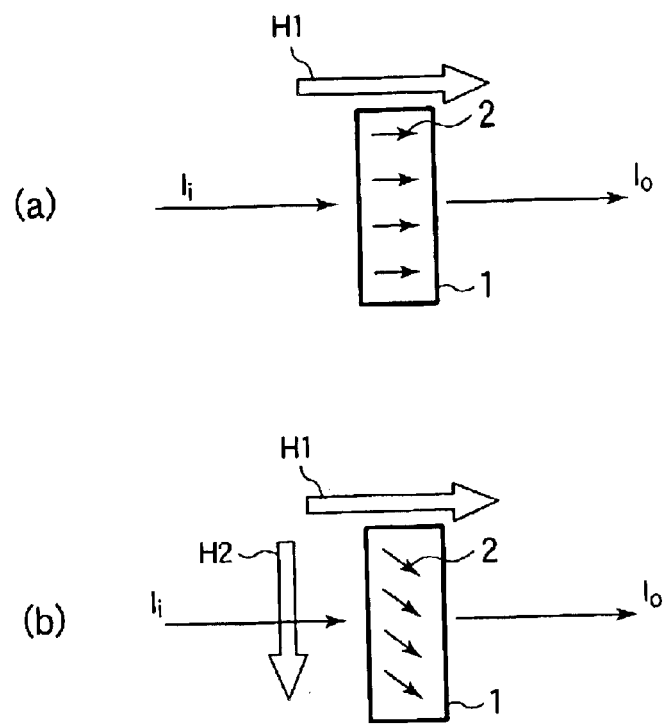
FIG. 7 is a view showing the mode of Faraday rotation angle change in the optical device of FIG. 6.

FIG. 6 shows the outline of the optical device of this Example. FIG. 7 shows the mode of Faraday rotation angle change in the optical device of FIG. 6. As in FIG. 6, the optical device 10 illustrated comprises the Faraday rotator 1 and a magnetic circuit. The magnetic circuit comprises permanent magnets 12 and electromagnets 14. Concretely, a pair of permanent magnets 12 is disposed on both sides of the Faraday rotator 1 that inputs the light Ii and outputs the light Io, with their magnetic poles being aligned in order. These permanent magnets 12 apply a fixed magnetic field H1 to the rotator 1 in the direction in which the light travels through the rotator 1, as in FIG. 7A. On the other hand, electromagnets 14 are so disposed that these apply to the Faraday rotator 1 a variable magnetic field H2 in the direction almost perpendicular to the direction of the fixed magnetic field H1. The intensity of the variable magnetic field H2 is controlled by varying the current to run through the coil (not shown) of each electromagnet 14.

As in FIGS. 7A and 7B, the external magnetic field H is a composite magnetic field of the fixed magnetic field H1 and the variable magnetic field H2. By varying the intensity of the variable magnetic field H2, the direction of the external magnetic field H to be applied to the Faraday rotator 1 may be varied and the intensity of magnetization of the rotator 1 in the light-traveling direction may be thereby varied.

The Faraday rotation angle of the Faraday rotator 1 in the optical device 10 was measured. In one case, the intensity of the magnetic field (fixed magnetic field H1) in the light-traveling direction was made the same as that of the saturation magnetic field Hs, 240 Oe (see FIG. 7A), and the intensity of the variable magnetic field H2 to be generated by the electromagnets 14 was so controlled that the Faraday rotation angle of the rotator 1 could be 15 degrees, or that is, the reduction in the rotation angle thereof could be 15 degrees (see FIG. 7B). The current applied to the coil of each electromagnet 14 for controlling the magnetic field intensity as above was 100 mA.

In another case, the intensity of the fixed magnetic field H1 was made 150 Oe in the light-traveling direction (see FIG. 7A), and the intensity of the variable magnetic field H2 to be generated by the electromagnets 14 was so controlled that the Faraday rotation angle of the rotator 1 could be 14.8 degrees, or that is, the reduction in the rotation angle of the rotator 1 could be around 15 degrees (see FIG. 7B). The current applied to the coil of each electromagnet 14 for controlling the magnetic field intensity in this case was 63 mA.

In still another case, the intensity of the fixed magnetic field H1 was made 0.4 times the saturation magnetic field Hs, or that is, 96 Oe in the light-traveling direction (see FIG. 7A), and the intensity of the variable magnetic field H2 to be generated by the electromagnets 14 was so controlled that the Faraday rotation angle of the rotator 1 could be 13.2 degrees, or that is, the reduction in the rotation angle of the rotator 1 could be around 15 degrees (see FIG. 7B). The current applied to the coil of each electromagnet 14 for controlling the magnetic field intensity in this case was 41 mA.

As so described hereinabove, the optical device 10 of this Example comprises the Faraday rotator 1 formed of a garnet single crystal, and the magnetic circuit that applies the external magnetic field H of which the intensity is smaller than that of the saturation magnetic field Hs of the rotator 1 to the Faraday rotator 1. In the optical device 10 having this constitution, the direction and the intensity of the external magnetic field H to be applied to the Faraday rotator 1 are changed to thereby change the direction of the magnetic moment 2 in the rotator 1, and the Faraday rotation angle of the rotator 1 may be thereby changed.

In the optical device 10 that comprises the Faraday rotator 1 and the magnetic circuit of this Example, when the intensity |H| of the external magnetic field H applied to the Faraday rotator 1 in the light-traveling direction through the rotator 1 satisfies the requirement of $0.4\times|Hs|<|H|<|Hs|$ where |Hs| indicates the intensity of the saturation magnetic field Hs of the Faraday rotator 1, then the magnetic circuit to be combined with the Faraday rotator 1 may be small-sized and its power consumption may be reduced, and, in addition, the light loss through the Faraday rotator 1 may be reduced in that condition.

Figure 9:
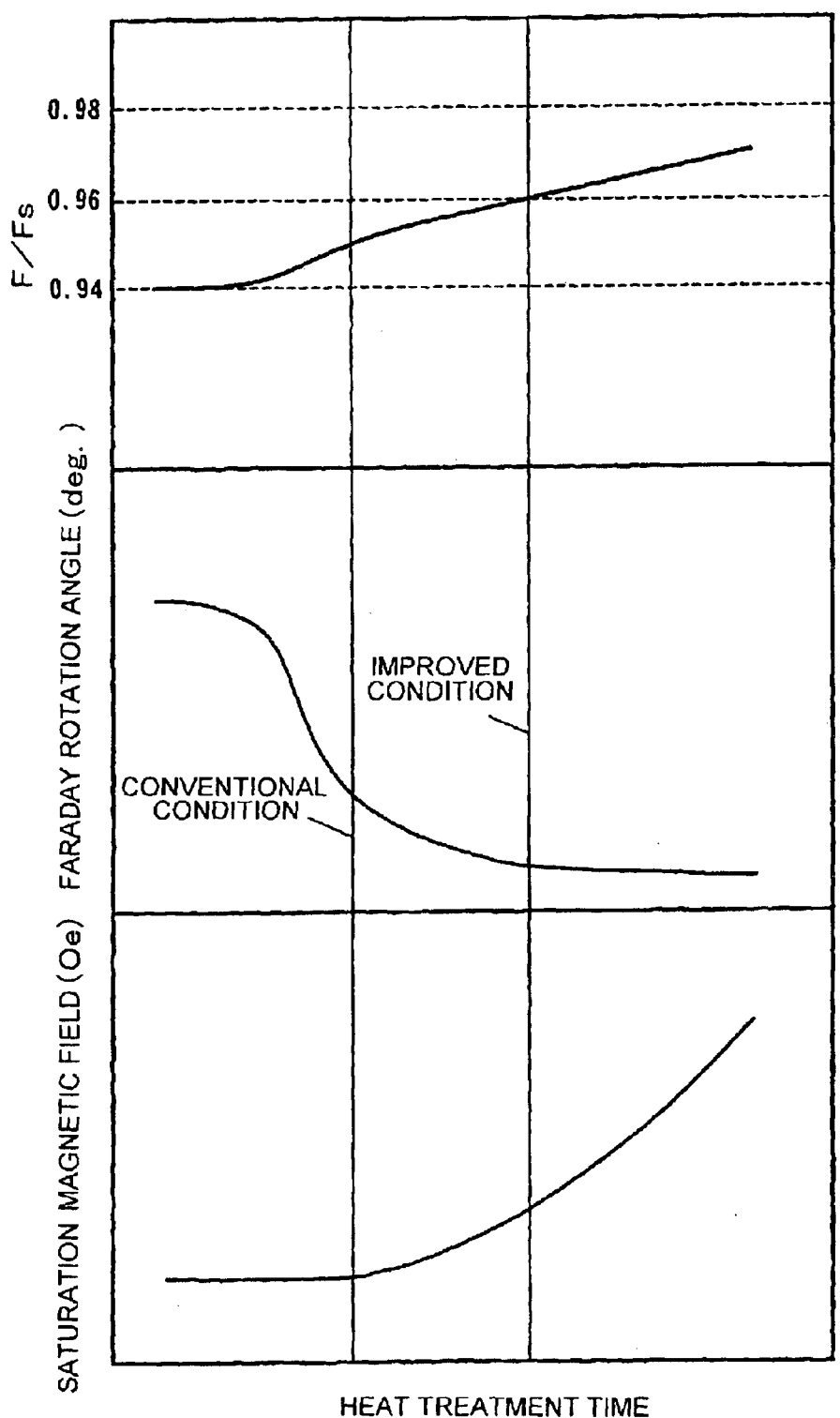
FIG. 9 is a view for explaining the operation principle of the Faraday rotator of the second embodiment of the invention, in which the horizontal axis indicates the time for heat treatment; the lower row of the vertical axis indicates the intensity (Oe) of the saturation magnetic field Hs in the film growth direction; the middle row thereof indicates the Faraday rotation angle (deg.); and the upper row thereof indicates a ratio F/Fs wherein F indicates the Faraday rotation angle of the rotator having received an external magnetic field of 0.9 times the saturation magnetic field Hs of the rotator, and Fs indicates the saturation rotation angle of the rotator having received the saturation magnetic field Hs thereof.

Second Embodiment of the Invention:

The Faraday rotator and the optical device that comprises it of the second embodiment of the invention are described with reference to FIG. 9 to FIG. 15. First referred to is FIG. 9 that shows the operation principle of the Faraday rotator of this embodiment. In FIG. 9, the horizontal axis indicates the time for heat treatment; the lower row of the vertical axis indicates the intensity (Oe) of the saturation magnetic field Hs in the film growth direction; the middle row thereof indicates the Faraday rotation angle (deg.); and the upper row thereof indicates a ratio F/Fs wherein F indicates the Faraday rotation angle of the rotator having received an external magnetic field of 0.9 times the saturation magnetic field Hs of the rotator, and Fs indicates the saturation rotation angle of the rotator having received the saturation magnetic field Hs thereof.

Of an epitaxially-grown film, the growth-induced magnetic anisotropy is caused by periodic micro-texture change in the film growth direction owing to the ambient temperature change or the flux convection fluctuation during epitaxial growth of the film. When the epitaxial film of the type is subjected to heat treatment, then the atoms constituting it are rearranged to reduce the periodic micro-texture change in the film growth direction and the growth-induced magnetic anisotropy of the film is thereby reduced. Heat treatment at a higher temperature for a longer period of time is more effective for reducing the growth-induced magnetic anisotropy of the epitaxial film heat-treated under the condition. The easy axis of magnetic garnet single crystal is parallel to the crystal orientation of <111>. In general, a CaMgZr-substituted GGG substrate is used for growing a magnetic garnet single-crystal film, and the crystal grows on its (111) plane.

Accordingly, one of multiple easy axes <111> of garnet single crystal is oriented vertically to the crystal-growing plane of the GGG substrate, and this is parallel to the growth-induced magnetic anisotropy orientation. Since the two are parallel to each other, the magnetic moment orientation of the magnetic garnet single-crystal film formed through epitaxial growth is fixed in the crystal-growing direction. When the growth-induced magnetic anisotropy is reduced in the heat-treated film, the magnetic moment of the resulting film may also be readily shifted to the other crystal orientations of <111> than the film growth direction. In particular, since a single-crystal film having grown to be tabular is worked into a Faraday rotator and therefore the thus-worked Faraday rotator is a tabular optical device, the magnetic moment direction in the Faraday rotator will be oriented in the <111> direction obliquely relative to the film growth direction, owing to the shape effect of the rotator.

As in the lower row of FIG. 9, the saturation magnetic field Hs in the film growth direction is larger after heat treatment than before heat treatment. In addition, the saturation magnetic field Hs in the film growth direction is larger when the heat treatment time is longer. As so mentioned hereinabove, therefore, the heat treatment for reducing the growth-induced magnetic anisotropy has heretofore been so designed that the magnetic moment orientation in the heat-treated film could be variable in any desired direction and the saturation magnetic field Hs of the heat-treated film does not increase as much as possible. For this, for example, the heat treatment time is selected as in the "conventional condition" in FIG. 9.

However, as in the middle row of FIG. 9, the Faraday rotation angle F of the rotator rapidly reduces after the start of heat treatment, and it takes a considerably long period of time for heat treatment before the angle change is stabilized, much over the heat treatment time in the "conventional condition".

Accordingly, if the film is heat-treated for a period of time that is defined according to the "conventional condition" for which the first requirement is not to increase as much as possible the saturation magnetic field Hs of the heat-treated film, this brings about a problem in that the Faraday rotation angle of the rotator greatly fluctuates even when the heat treatment time changes only slightly, as in the middle row of FIG. 9. This brings about another problem in that the magneto-optic-type optical attenuator that comprises the Faraday rotator formed of the film could not realize satisfactory attenuation.

Figure 10:
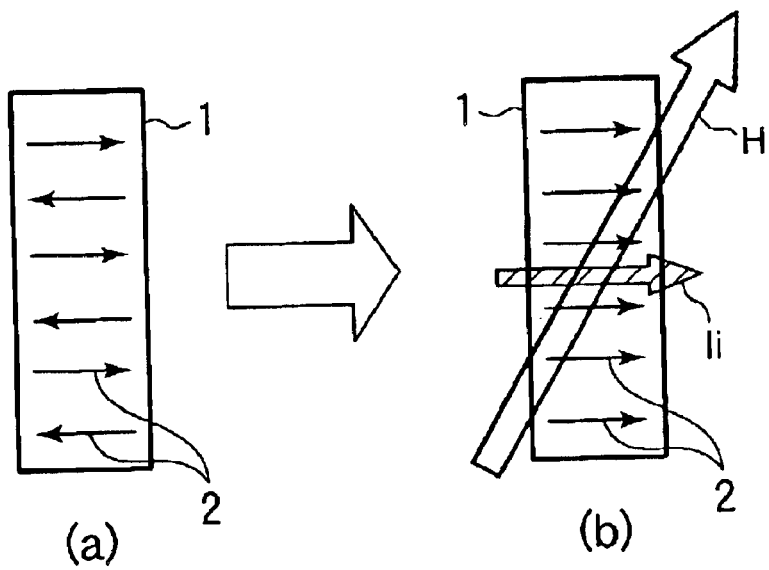
FIG. 10 is a view for explaining the operation principle of the Faraday rotator of the second embodiment of the invention, and this illustrates the relationship between the direction of the magnetic moment of a non-heated Faraday rotator and the external magnetic field H applied to the rotator.
Figure 11:
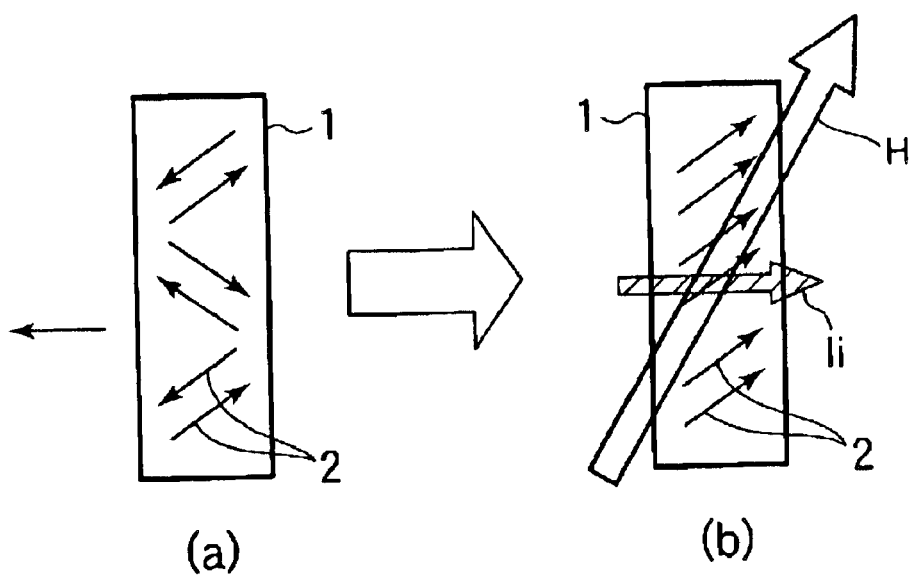
FIG. 11 is a view for explaining the operation principle of the Faraday rotator of the second embodiment of the invention, and this illustrates the relationship between the direction of the magnetic moment of a heat-treated Faraday rotator and the external magnetic field H applied to the rotator.

Now referred to are FIG. 10 and FIG. 11 for describing the relationship between the direction of the magnetic moment 2 and the external magnetic field H. In FIG. 10, the Faraday rotator 1 is not subjected to heat treatment. In this, the light-input surface of the Faraday rotator 1 is almost perpendicular to the crystal growth direction of the garnet single crystal that forms the rotator.

As in FIG. 10A, the easy axis of the garnet single crystal that forms the non-heated Faraday rotator 1 is parallel to the crystal growth direction. Therefore, with no magnetic filed applied thereto, the Faraday rotator 1 shall have a non-uniform magnetic domain structure in which a part of the magnetic moment 2 is oriented in one direction of the easy axis while the other thereof is in the opposite direction.

As in FIG. 10B, when an external magnetic field H, of which the component almost perpendicular to the light-input surface of the garnet single crystal is larger than the saturation magnetic field Hs, is applied to the Faraday rotator 1 in the oblique direction, then the magnetic moment 2 is shifted in one direction in the entire region of the rotator 1 and the magnetic domain structure in the rotator 1 is unified. The Faraday rotation angle of the Faraday rotator 1 in that condition is referred to as the saturation rotation angle Fs of the rotator 1.

FIG. 11 shows the relationship between the direction of the magnetic moment 2 of a heat-treated Faraday rotator 1 and the external magnetic field H applied to the rotator 1. In FIG. 11, the light-input surface of the Faraday rotator 1 is almost perpendicular to the crystal growth direction of the garnet single crystal that forms the rotator.

As in FIG. 11A, the easy axis in the garnet single crystal to form the heat-treated Faraday rotator 1 is shifted from the crystal growth direction toward the direction parallel to the (100) crystal plane. However, with no magnetic field applied thereto, a part of the magnetic moment 2 in the Faraday rotator 1 is oriented in one direction of the easy axis but the other thereof is in the opposite direction, and a non-uniform magnetic domain structure is formed in the rotator 1.

As in FIG. 11B, when an external magnetic field H, of which the component almost perpendicular to the light-input surface of the garnet single crystal is larger than the saturation magnetic field Hs, is applied to the heat-treated Faraday rotator 1 in the oblique direction, then the magnetic moment 2 is shifted in one direction in the entire region of the rotator 1 and the magnetic domain structure in the rotator 1 is unified, like in the non-heated Faraday rotator 1. In the heat-treated Faraday rotator 1, however, the easy axis is inclined relative to the normal direction of the substrate surface and the direction of the magnetic moment 2 is therefore inclined relative to the normal direction of the substrate surface in accordance with the direction of the external magnetic field H applied to the rotator 1. Therefore, the Faraday rotation angle F of the rotator 1 in this condition is smaller than the saturation rotation angle Fs.

When heated for a longer period of time, the growth-induced magnetic anisotropy of the magnetic garnet single-crystal film reduces, and, as a result, the direction of the magnetic moment 2 in the thus-heated rotator 1 comes to be more readily shifted by the influence of the external magnetic field H applied to the rotator 1. When the rotator 1 is heat-treated for a period of time around the "conventional condition" shown in FIG. 9, then the variability of the magnetic moment orientation of the thus-heated rotator 1 greatly increases and, as a result, the fluctuation in the Faraday rotation angle F of the rotator 1 therefore increases as in the middle row of FIG. 9. When the heat treatment time is further prolonged, then the variability of the magnetic moment orientation in the thus-heated rotator 1 is almost stabilized independently of the external magnetic field H. This is because the growth-induced magnetic an isotropy of the heat-treated rotator 1 is reduced and therefore the variability of the magnetic moment orientation in the rotator 1 is influenced little by the thus-reduced, growth-induced magnetic anisotropy of the rotator 1. Accordingly, as in the middle row of FIG. 9, the fluctuation in the Faraday rotation angle F of the rotator 1 becomes small and the Faraday rotation angle F is then stabilized.

As in the lower row of FIG. 9, the saturation magnetic field Hs of the heated Faraday rotator 1 greatly increases with the increase in the heat treatment time. This means that the magnetic moment orientation in the heat-treated Faraday rotator 1 has come to be readily oriented in the direction except the film growth direction, and, as a result, the rotator 1 therefore requires a stronger external magnetic field H for making the magnetic moment direction therein shifted in the film growth direction. As so mentioned hereinabove, when a magnetic field smaller than the saturation magnetic field Hs thereof is applied to the Faraday rotator 1, then it causes diffraction loss and the device characteristics are therefore worsened. To evade the problem, the Faraday rotator 1 has heretofore been heat-treated under the "conventional condition" under which the saturation magnetic field Hs of the rotator 1 does not increase as much as possible. However, the heat treatment condition is the condition under which the variability of the magnetic moment orientation in the heat-treated rotator 1 fluctuates most greatly depending on the fluctuation in the heat treatment time. In the heat treatment for a period of time for the "conventional condition" and therearound, the difference in the heat treatment condition, for example, slight temperature change owing to the temperature fluctuation in the kiln during heat treatment or the sample position in the kiln may have a significant influence on the degree of change of the magnetic moment orientation in the heat-treated Faraday rotator 1. Accordingly, as in the middle row of FIG. 9, the Faraday rotation angle F of the heat-treated rotator 1 noticeably fluctuates.

However, when the heat treatment time is prolonged in some degree from the "conventional condition" to the "improved condition" as in FIG. 9, then the magnetic moment orientation fluctuation may be reduced and the fluctuation in the Faraday rotation angle F of the heated rotator 1 may also be reduced. In that condition, therefore, the heated Faraday rotator 1 may all the time realize a stable Faraday rotation angle F independently of the heat treatment time change.

Figure 12:
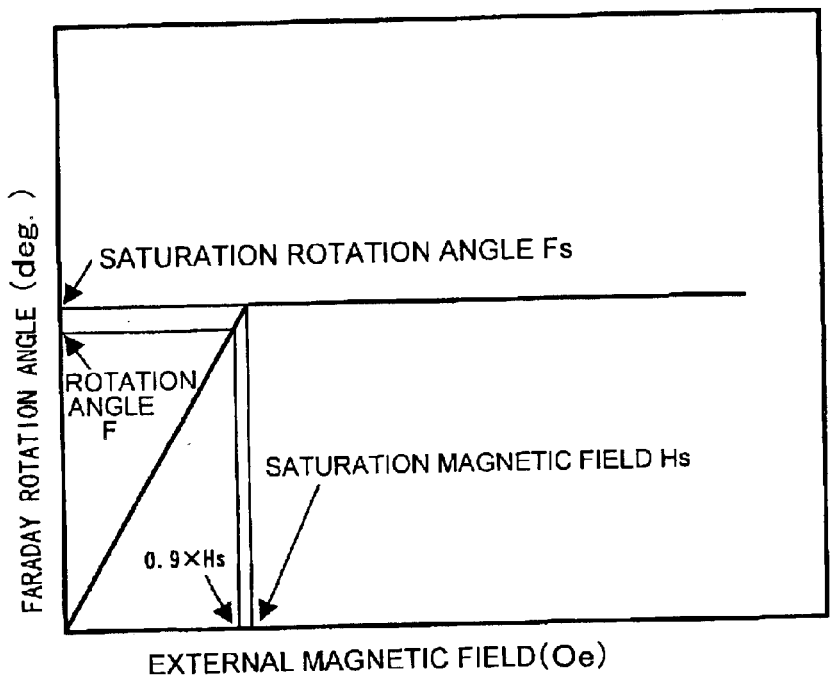
FIG. 12 is a view for explaining the operation principle of the Faraday rotator of the second embodiment of the invention, and this illustrates the relationship between the Faraday rotation angle of a non-heated Faraday rotator and the external magnetic field H applied to the rotator.

FIG. 12 shows the relationship between the external magnetic field H applied to a non-heated Faraday rotator 1 and the Faraday rotation angle F of the rotator 1. In this, the horizontal axis indicates the external magnetic field H (Oe), and the vertical axis indicates the Faraday rotation angle (deg.). On the horizontal axis, the value Hs indicates the intensity of the saturation magnetic field Hs of the non-heated Faraday rotator 1. On the horizontal axis, the value of 0.9×Hs indicates the intensity of about 90% of the saturation magnetic field Hs. In FIG. 12, the external magnetic field H applied to the non-heated Faraday rotator 1 is in the direction of growth of the garnet single crystal to form the rotator 1 and in the light-traveling direction through the rotator 1.

Figure 13:
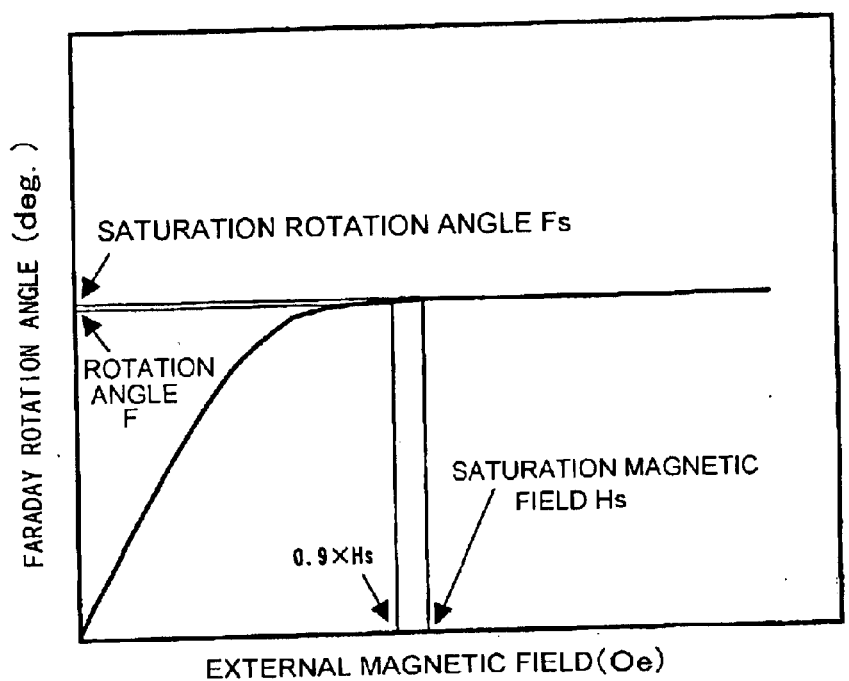
FIG. 13 is a view for explaining the operation principle of the Faraday rotator of the second embodiment of the invention, and this illustrates the relationship between the Faraday rotation angle of a heat-treated Faraday rotator and the external magnetic field H applied to the rotator.

FIG. 13 shows the relationship between the external magnetic field H applied to a heat-treated Faraday rotator 1 and the Faraday rotation angle F of the rotator 1. In this, the horizontal axis indicates the external magnetic field H (Oe), and the vertical axis indicates the Faraday rotation angle (deg.) On the horizontal axis, the value Hs indicates the intensity of the saturation magnetic field Hs of the heat-treated Faraday rotator 1. On the horizontal axis, the value of 0.9×Hs indicates the intensity of about 90% of the saturation magnetic field Hs. Also in FIG. 13, the external magnetic field H applied to the heat-treated Faraday rotator 1 is in the direction of growth of the garnet single crystal to form the rotator 1 and in the light-traveling direction through the rotator 1.

FIG. 12 is compared with FIG. 13. The saturation magnetic field Hs of the heat-treated Faraday rotator 1 increases, and the Faraday rotation angle F of the rotator 1 having received the external magnetic field H of which the intensity is near to that of the saturation magnetic field Hs thereof is extremely near to the saturation rotation angle Fs. For example, when an external magnetic field H of 0.9 times the saturation magnetic field Hs of the non-heated Faraday rotator 1 is applied to the rotator 1 as in FIG. 12, then the ratio of F/Fs to be obtained by dividing the Faraday rotation angle F of the rotator 1 by the saturation rotation angle Fs thereof is 0.94 as in the upper row of FIG. 9. As opposed to this, when an external magnetic field H of 0.9 times the saturation magnetic field Hs of the Faraday rotator 1 having been subjected to heat treatment under the "conventional condition" is applied to the rotator 1, then the ratio F/Fs is 0.95 as in the upper row of FIG. 9. On the other hand, the ratio F/Fs of the Faraday rotator 1 having been subjected to heat treatment under the "improved condition" which is for improving the heat treatment time-dependent fluctuation of the Faraday rotation angle F is 0.96 or more as in the upper row of FIG. 9. The ratio F/Fs is about 0.94 without heat treatment and is about 0.95 after heat treatment under the "conventional condition", as in the upper row of FIG. 9. Contrary to these, the ratio F/Fs is at least 0.96 or more after heat treatment under the "improved condition" of this embodiment of the invention.

Long-term heat treatment of the Faraday rotator 1 for reducing the heat treatment time-dependent fluctuation of the Faraday rotation angle F of the rotator 1 results in the increase in the saturation magnetic field Hs of the rotator 1, but the diffraction loss in the rotator 1 may be reduced by using an external magnetic circuit capable of applying a larger external magnetic field H to the rotator 1. As in FIG. 13, the Faraday rotation angle F of the Faraday rotator 1 having been heat-treated for a long period of time may be at least 0.96 times the saturation rotation angle Fs thereof applied by the saturation magnetic field Hs thereof, except that the external magnetic field H applied to the rotator 1 is far smaller than the saturation magnetic field Hs thereof, for example, even when the external magnetic field H applied to the rotator 1 is at most 0.9 times the saturation magnetic field Hs. From this, it is understood that the Faraday rotator 1 causes little diffraction loss therein and is therefore enough for practical use.

As is obvious from FIG. 12 and FIG. 13, there is a definite correlation between the external magnetic field H to be applied to the Faraday rotator 1 and the Faraday rotation angle F of the rotator 1. In addition, as is also obvious from FIG. 9, the fluctuation of the Faraday rotation angle F has a definite correlation with the heat treatment time for the rotator 1. When the Faraday rotator 1 is heat-treated under the condition that satisfies the ratio F/Fs of at least 0.96, then the Faraday rotation angle F of the rotator 1 is prevented from fluctuating too much and is thereby stabilized and, in addition, the range of the variable rotation angle of the rotator 1 may be kept almost on the same level as that of the rotator 1 having received the saturation magnetic field Hs thereof. The ratio FIFs of the rotator 1 is obtained by dividing the Faraday rotation angle F of the rotator 1 having received an external magnetic field H of 0.9 times the saturation magnetic field Hs thereof by the saturation rotation angle thereof Fs of the rotator 1.

One example of the garnet single crystal to form the Faraday rotator 1 of this embodiment is represented by $Bi_aA_{3-a}Fe_{5-x}M_xO_{12}$ wherein A is at least one element of Y, Lu, Yb, Er, Ho, Dy, Tb, Gd, Eu, Sm, Nd, Pr, Ce, La, Pb and Ca; a satisfies $0.6 \leq a \leq 2.0$; M is at least one element of Ga, Al, Sc, In, Si, Ge, Ti, Au, Ir and Pt; x satisfies $0 \leq x \leq 1.5$.

Another example of the garnet single crystal to form the Faraday rotator 1 of this embodiment is represented by $Bi_bA_cB_{3-b-c}Fe_{5-x}M_xO_{12}$ wherein A is at least one element of Y, Lu, Yb, Er, Ho, Eu, Sm, Nd, Pr, Ce, La, Pb and Ca; B is at least one element of Tb, Gd and Dy; b and c satisfy $0.6 \leq b \leq 2.0$ and $0.6 < b+c \leq 3.0$; M is at least one element of Ga, Al, Sc, In, Si, Ge, Ti, Au, Ir and Pt; and x satisfies $0 \leq x \leq 1.5$.

One advantage of magnetic garnet that contains any of Gd, Tb or Dy as the essential rare earth element therein is that its saturation magnetic field Hs is reduced, and the rotator formed of the magnetic garnet of the type may be driven even with small-sized and power-saving magnetic circuits. The effect is more significant when the chemical formula that represents the magnetic garnet satisfies the rare earth element content to fall between 0 and 2.4.

Regarding the Bi content of the magnetic garnet, if the index of the Bi content in the chemical formulae is less than 0.6, the Faraday rotation coefficient (Faraday rotation angle F/thickness T of Faraday rotator) of the rotator 1 formed of the magnetic garnet will be low and the thickness of the rotator 1 to attain the predetermined Faraday rotation angle F shall increase, and, if so, the garnet single-crystal film for the rotator 1 is difficult to grow. On the other hand, if the index of the Bi content of the magnetic garnet is more than 2.0, the crystal growing condition in epitaxial growth of the garnet single-crystal film will be unstable and single-crystal films of good quality could not be obtained. For these reasons, the Bi content of the magnetic garnet to form the Faraday rotator 1 preferably fails between 0.6 and 2.0 in terms of the index thereof.

In the chemical formulae, M is the element substitutable for Fe. The element M, if any, in the magnetic garnet reduces the saturation magnetic field Hs of the Faraday rotator 1 formed of the magnetic garnet. However, if the content of the element M indicated by x to be substituted for Fe is more than 1.5 in the chemical formulae, the Curie point of the magnetic garnet will be lower than the operation temperature of the Faraday rotator 1 made of such magnetic garnet, and, if so, the Faraday rotator 1 is no more functional. Accordingly, the M content of the magnetic garnet preferably satisfies $0 \leq x \leq 1.5$.

The invention of this embodiment is described more concretely with reference to the following Examples.

EXAMPLE 2-1

A magnetic garnet single-crystal film having a composition of $Bi_{1.2}Gd_{1.2}Yb_{0.5}Pb_{0.05}Fe_{4.15}Ga_{0.8}Pt_{0.01}Ge_{0.04}O_{12}$ was grown in a mode of liquid-phase epitaxial growth, and worked into a magnetic garnet single-crystal plate. An external magnetic field H was applied to the thus-fabricated single-crystal plate substrate in the direction perpendicular to the single-crystal substrate surface, and the Faraday rotation angle F of the plate substrate was measured. The saturation magnetic field Hs of the sample was measured at room temperature, and it was 110 Oe. The saturation rotation angle Fs of the sample was measured with the saturation magnetic field Hs thereof being applied thereto, and it was 30 degrees. An external magnetic field H, 0.9 times the saturation magnetic field Hs, of 99 Oe was applied thereto, and the Faraday rotation angle F of the sample was measured, and was 28.2 degrees. The ratio of Faraday rotation angle F/saturation rotation angle Fs of the sample was 0.94.

Ten and the same single crystal samples were prepared and heated at 1100° C. for 15 hours, and then the saturation magnetic field Hs of each sample was measured at room temperature in the same manner as above. It was 150 Oe each. The saturation rotation angle Fs of each sample measured with its saturation magnetic field Hs being applied thereto was 30 degrees. An external magnetic field H, 0.9 times the saturation magnetic field Hs, of 135 Oe was applied thereto, and the Faraday rotation angle F of each sample was measured, and was 28.8 degrees. The ratio of Faraday rotation angle F/saturation rotation angle Fs of the heated samples was 0.96. An external magnetic field H1 of 135 Oe was applied to the Faraday rotator 1 formed of the single crystal, perpendicularly to the light-input surface and the light-output surface of the rotator 1, and another external magnetic field H2 of 300 Oe was thereto in the direction parallel to the light-input surface and the light-output surface of the rotator 1. In that condition, the Faraday rotation angle F of the rotator 1 was measured. The data of the Faraday rotation angle F of ten and the same Faraday rotators 1 measured in the manner as above fluctuated within a range of from 2.2 to 2.5 degrees. That is, the variable rotation angle of the samples tested falls between 26.3 and 26.6 degrees, and this means that the Faraday rotation angle characteristics of the rotator 1 obtained herein are stable.

EXAMPLE 2-2

A magnetic garnet single-crystal film having a composition of $Bi_{1.2}Tb_{0.8}Ho_{0.9}Pb_{0.05}Fe_{4.15}Ga_{0.8}Pt_{0.01}Ge_{0.04}O_{12}$ was grown in a mode of liquid-phase epitaxial growth, and worked into a magnetic garnet single-crystal plate. An external magnetic field H was applied to the thus-fabricated single-crystal plate substrate in the direction perpendicular to the single-crystal substrate surface, and the Faraday rotation angle F of the plate substrate was measured. The saturation magnetic field Hs of the sample was measured at room temperature, and it was 110 Oe. The saturation rotation angle Fs of the sample was measured with the saturation magnetic field Hs thereof being applied thereto, and it was 30 degrees. An external magnetic field H, 0.9 times the saturation magnetic field Hs, of 99 Oe was applied thereto, and the Faraday rotation angle F of the sample was measured, and was 28.2 degrees. The ratio of Faraday rotation angle F/saturation rotation angle Fs of the sample was 0.94.

Ten and the same single crystal samples were prepared and heated at 1100° C. for 30 hours, and then the saturation magnetic field Hs of each sample was measured at room temperature in the same manner as above. It was 300 Oe each. The saturation rotation angle Fs of each sample measured with its saturation magnetic field Hs being applied thereto was 30 degrees. An external magnetic field H, 0.9 times the saturation magnetic field Hs, of 270 Oe was applied thereto, and the Faraday rotation angle F of each sample was measured, and was 29.7 degrees. The ratio of Faraday rotation angle F/saturation rotation angle Fs of the heated samples was 0.99. An external magnetic field H1 of 150 Oe was applied to the Faraday rotator 1 formed of the single crystal, perpendicularly to the light-input surface and the light-output surface of the rotator 1, and another external magnetic field H2 of 350 Oe was thereto in the direction parallel to the light-input surface and the light-output surface of the rotator 1. In that condition, the Faraday rotation angle F of the rotator 1 was measured. The data of the Faraday rotation angle F of ten and the same Faraday rotators 1 measured in the manner as above fluctuated within a range of from 2.0 to 2.2 degrees. That is, the variable rotation angle of the samples tested falls between 27.5 and 27.7 degrees, and this means that the Faraday rotation angle characteristics of the rotator 1 obtained herein are stable.

COMPARATIVE EXAMPLE 2-1

A magnetic garnet single-crystal film having a composition of $Bi_{1.2}Gd_{1.2}Yb_{0.5}Pb_{0.05}Fe_{4.15}Ga_{0.8}Pt_{0.01}Ge_{0.04}O_{12}$ was grown in a mode of liquid-phase epitaxial growth, and worked into a magnetic garnet single-crystal plate. An external magnetic field H was applied to the thus-fabricated single-crystal plate substrate in the direction perpendicular to the single-crystal substrate surface, and the Faraday rotation angle F of the plate substrate was measured. The saturation magnetic field Hs of the sample was measured at room temperature, and it was 110 Oe. The saturation rotation angle Fs of the sample was measured with the saturation magnetic field Hs thereof being applied thereto, and it was 30 degrees. An external magnetic field H, 0.9 times the saturation magnetic field Hs, of 99 Oe was applied thereto, and the Faraday rotation angle F of the sample was measured, and was 28.2 degrees. The ratio of Faraday rotation angle F/saturation rotation angle Fs of the sample was 0.94.

Ten and the same single crystal samples were prepared and heated at 1100° C. for 10 hours, and then the saturation magnetic field Hs of each sample was measured at room temperature in the same manner as above. It was 120 Oe each. The saturation rotation angle Fs of each sample measured with its saturation magnetic field Hs being applied thereto was 30 degrees. An external magnetic field H, 0.9 times the saturation magnetic field Hs, of 108 Oe was applied thereto, and the Faraday rotation angle F of each sample was measured, and was 28.5 degrees. The ratio of Faraday rotation angle F/saturation rotation angle Fs of the heated samples was 0.95. An external magnetic field H1 of 120 Oe was applied to the Faraday rotator 1 formed of the single crystal, perpendicularly to the light-input surface and the light-output surface of the rotator 1, and another external magnetic field H2 of 300 Oe was thereto in the direction parallel to the light-input surface and the light-output surface of the rotator 1. In that condition, the Faraday rotation angle F of the rotator 1 was measured. The data of the Faraday rotation angle F of ten and the same Faraday rotators 1 measured in the manner as above fluctuated within a range of from 4.8 to 11.0 degrees. That is, the variable rotation angle of the samples tested falls between 19.0 and 25.2 degrees, and this means that the Faraday rotation angle characteristics of the rotator 1 obtained herein are unstable.

According to this embodiment described hereinabove, the Faraday rotator formed of a Bi-substituted rare earth-iron-garnet single-crystal film is heated so that its value F/Fs could be at least 0.96. The ratio F/Fs of the rotator is obtained by dividing the Faraday rotation angle F of the rotator having received an external magnetic field H of 0.9 times the saturation magnetic field Hs thereof by the saturation rotation angle thereof Fs of the rotator. Thus obtained, the Faraday rotation angle F of the Faraday rotator 1 is prevented from fluctuating too much and is thereby stabilized and, in addition, the variable angle of the rotator 1 is wide. This embodiment of the invention provides the Faraday rotator 1 having the advantages and an optical device that comprises the rotator 1.

Figure 14:
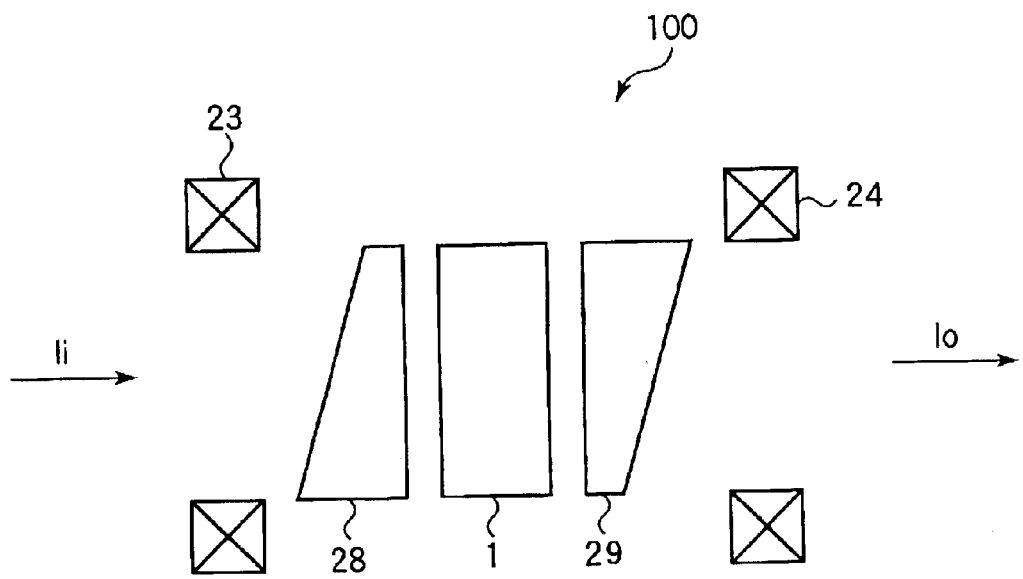
FIG. 14 is a view showing the outline of the Faraday rotator of the second embodiment of the invention and an optical isolator that comprises the rotator.

Next described is the outline of an optical isolator 100, one example of the optical device that comprises the Faraday rotator of this embodiment, with reference to FIG. 14. FIG. 14 shows the outline of the optical isolator 100, one example of this embodiment. As illustrated, the optical isolator 100 of FIG. 14 has the Faraday rotator 1 of this embodiment. A polarizer 28 is disposed before the Faraday rotator 1, facing the light-input surface of the rotator 1; and an optical detector 29 is after the Faraday rotator 1, facing the light-output surface of the rotator 1.

A magnetic circuit is provided, which is for applying the saturation magnetic field thereof to the Faraday rotator 1 to thereby make the rotator 1 have a predetermined Faraday rotation angle. The magnetic circuit comprises a pair of permanent magnet rings 23 and 24. The pair of permanent magnet rings 23 and 24 are disposed on both sides of the Faraday rotator 1 that inputs the light Ii and outputs the light Io, with their magnetic poles being aligned in order. These permanent magnet rings 23 and 24 apply the saturation magnetic field thereof to the Faraday rotator 1 in the direction in which the light travels through the rotator 1.

Figure 15:
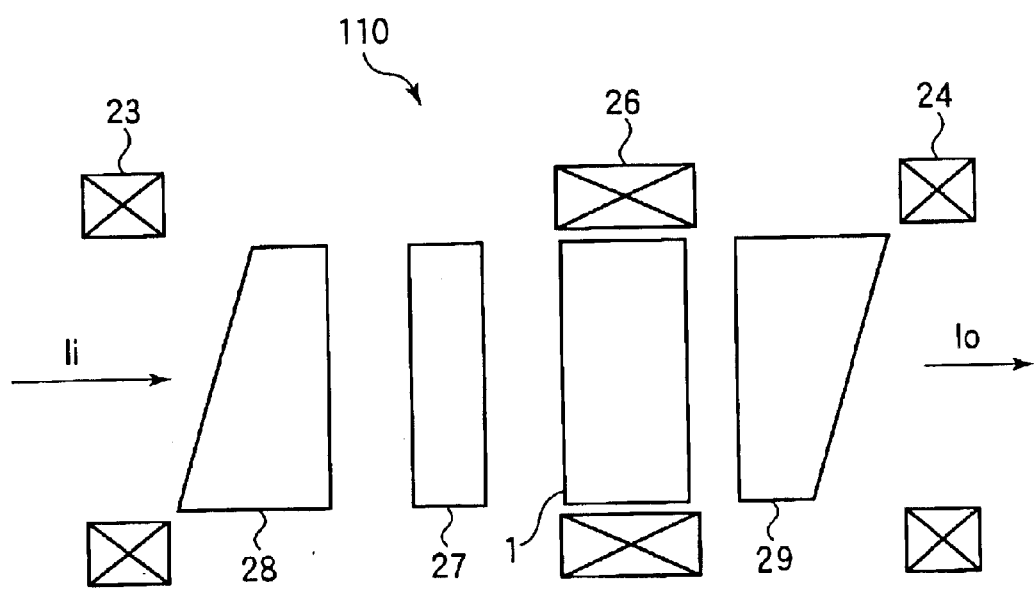
FIG. 15 is a view showing the outline of the Faraday rotator of the second embodiment of the invention and an optical attenuator that comprises the rotator.

Next described is the outline of an optical attenuator 110, another example of the optical device that comprises the Faraday rotator of this embodiment, with reference to FIG. 15. FIG. 15 shows the outline of the optical attenuator 110, another example of this embodiment. As illustrated, the optical attenuator 110 of FIG. 15 has the Faraday rotator 1 of this embodiment. A polarizer 28 and an optical rotator 27 are disposed before the light-input surface of the Faraday rotator 1; and an optical detector 29 is after the light-output surface of the Faraday rotator 1. A magnetic circuit is provided, which is for applying the saturation magnetic field thereof to the Faraday rotator 1 to thereby make the rotator 1 have a predetermined Faraday rotation angle. The magnetic circuit comprises a pair of permanent magnet rings 23 and 24. The pair of permanent magnet rings 23 and 24 is disposed on both sides of the Faraday rotator 1 that inputs the light Ii and outputs the light Io, with their magnetic poles being aligned in order. These permanent magnet rings 23 and 24 apply a fixed magnetic field to the Faraday rotator 1 in the direction in which the light travels through the rotator 1.

Electromagnets 26 are so disposed that these apply a variable magnetic field in the direction almost perpendicular to the direction of the fixed magnetic field to the Faraday rotator 1. The intensity of the variable magnetic field is controlled by varying the current to run through the coil (not shown) of each electromagnet 26. By controlling the intensity of the variable magnetic filed in that manner, the Faraday rotation angle of the rotator 1 is controlled and the degree of attenuation of the quantity of light to be outputted by the optical attenuator 110 is thereby controlled.

Third Embodiment of the Invention:

The antireflection film and a method for forming it, and the optical device having the antireflection film of the third embodiment of the invention are described with reference to FIG. 16 to FIG. 23. First described is the outline of this embodiment. The center wavelength of the light wavelength range to be utilized in optical communication systems such as WDM is represented by λ. When an antireflection film on which the reflectance is at most 0.1% in the overall region of at least λ+/−70 nm is formed on both the light-input surface and the light-output surface of a magnetic garnet single-crystal structure, then it may solve the prior-art problem to the effect that the reflectance on the structure is large except for a specific wavelength range.

For optical communication, wavelength division multiplexing systems are constructed for each of different specific wavelength ranges of S band (1460 nm≦λ≦1530 nm), C band (1530 nm≦λ≦1565 nm) and L band (1565 nm≦λ≦1625 nm). Therefore, if the reflectance of the antireflection film formed on a Faraday rotator could be at most 0.1% in all these specific regions, the Faraday rotator coated with the antireflection film will be suitable to the different system. Specifically, even when multiple rays having different wavelengths are made to input the Faraday rotator coated with the antireflection film of the type, the reflected light on the surface of the Faraday rotator can be all uniformly reduced, and the Faraday rotator coated with the antireflection film is effective for stable operation of optical communication systems.

Antireflection thin films of oxides are often degraded, when tested for the necessary reliability for optical members for communication systems, and, as a result, the wavelength range within which the films are effective for antireflection may vary. In order that the antireflection films for use in optical communication still have the necessary antireflection characteristics even after they have been degraded and the wavelength range within which the films are effective for antireflection has been changed, the reflectance of the antireflection films must be at most 0.1% within a broader wavelength range than the overall wavelength range to be used in optical communication. Concretely, for this, the reflectance of the antireflection films must be at most 0.1% within a broad wavelength range of 140 nm that is broader than the wavelength range of S, C and L bands.

Antireflection films are composed of multiple thin layers of different oxides each having different refractive index. Increasing the number of the constitutive layers of the antireflection film and optimizing the thickness of each layer will make it possible to more accurately control the reflectance of the antireflection film and the wavelength range within which the film is effective for antireflection. For forming, on a magnetic garnet single-crystal plate, a wide-area antireflection film that is effective in a wavelength range broader than a range of 140 nm needed in wavelength division multiplexing systems, the antireflection film must be composed of at least 4 thin oxide layers. Increasing the number of the constitutive layers of the antireflection film is better in point of the antireflection characteristics of the film since the wavelength range within which the film is effective for antireflection may be broadened. However, increasing the number of the layers prolongs the process of completing the intended antireflection film and the film thus formed will be expensive. Another problem to be caused by the increased number of the constitutive layers is that the light insertion loss in the Faraday rotator coated with the film increases owing to the light absorption by the materials that form the layers. Accordingly, the number of the thin oxide layers to form the antireflection film of this embodiment is preferably at most 20. More preferably, the constitutive layers of the antireflection film are formed of materials of $Ta_2O_5$, $SiO_2$, $TiO_2$, $ZrO_2$, $Y_2O_3$, $LaF_3$, $Al_2O_3$, $MgF_2$ and the like, as their reliability is high and their light absorption is low.

Figure 16:
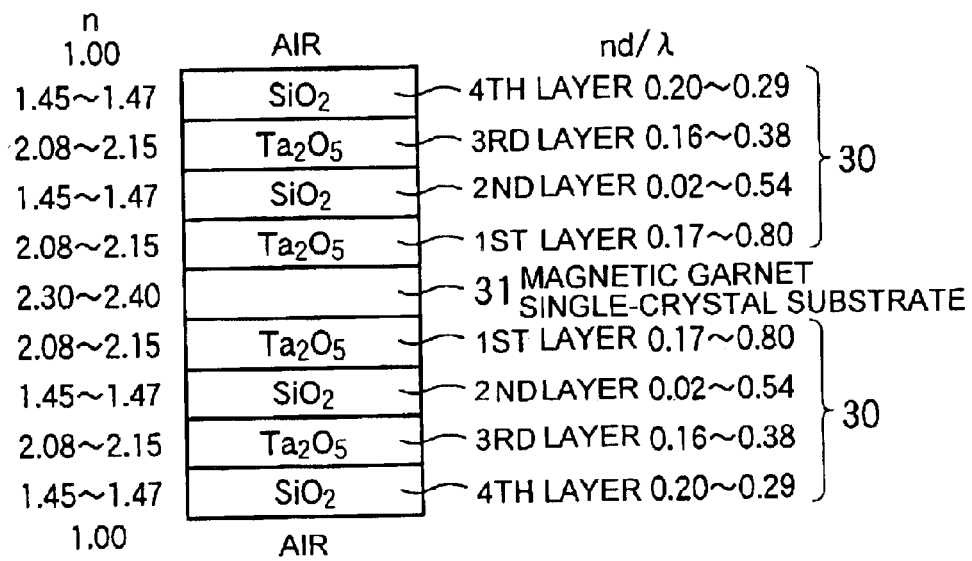
FIG. 16 is a view showing the condition of the antireflection film of the third embodiment of the invention, which is formed on both of the light-input/light-output surfaces of a magnetic garnet single-crystal substrate 31.

FIG. 16 shows the condition of the antireflection film 30 of this embodiment, which is formed on both of the light-input/light-output surfaces of a magnetic garnet single-crystal substrate 31. As in FIG. 16, a first layer, or that is, a first $Ta_2O_5$ layer that satisfies $0.17 \leq nd/\lambda \leq 0.80$ is formed on both surfaces of the magnetic garnet single-crystal substrate 31; then a second layer, or that is, a first $SiO_2$ layer that satisfies $0.02 \leq nd/\lambda \leq 0.54$ is formed on that first layer; then a third layer, or that is, a second $Ta_2O_5$ layer that satisfies $0.16 \leq nd/\lambda \leq 0.38$ is formed on that second layer; and a fourth layer, or that is, a second $SiO_2$ layer that satisfies $0.20 \leq nd/\lambda \leq 0.29$ is formed on that third layer. In this, $\lambda$ indicates the wavelength of the light transmitted by the layer, n indicates the refractive index of the layer and d indicates the thickness of the layer.

Based on the refractive index of air, 1, the refractive index, n, of the first and second $Ta_2O_5$ layers formed on both surfaces of the magnetic garnet single-crystal substrate 31 is controlled to fall within a range of $2.08 \leq n \leq 2.15$, and the refractive index, n, of the first and second $SiO_2$ layers is controlled to fall within a range of $1.45 \leq n \leq 1.47$.

In most cases, the Faraday rotator to be coated with the antireflection film 30 is formed of magnetic garnet, for which, however, preferred is Bi-substituted rare earth-iron-garnet to be formed in a mode of liquid-phase epitaxial growth from rare earth-iron-garnet such as YIG, in view of its productivity in commercial-scale mass production. In addition, for example, Tb is an element effective for improving the temperature characteristic and the wavelength characteristic of Faraday rotators, but it absorbs light in C band and L band. Therefore, if much Tb is in the magnetic garnet to form Faraday rotators, it will increase the insertion loss in rotators for C band and L band for which the rotators are combined with a wide-area antireflection film and used for multiple wavelengths. Therefore, too much Tb in the magnetic garnet is problematic for use in Faraday rotators for wavelength division multiplexing systems. For the same reasons as above, the other elements Er, Dy, Tb, Sm, Nd and Pr, if too much in the magnetic garnet to form Faraday rotators for use for optical communication, are also problematic as they absorb light that falls in the wavelength range to be used for optical communication. However, in the chemical compositional formula that represents magnetic garnet for Faraday rotators, the additional element content of not larger than 0.1 or so in terms of the index of the element content in the chemical formula will be negligible in practical use as it will not so much increase the insertion loss through the rotators formed. Accordingly, the additional element of which the content index does not exceed 0.1 is favorable for delicately controlling the properties of the rotators such as the wavelength characteristic, the temperature characteristic and the saturation magnetic field thereof. When a Faraday rotator for the C band in wavelength division multiplexing systems is formed of magnetic garnet that contains an additional element of Y, Lu, Yb, Ho, Gd, Ce, La, Pb or Ca not absorbing light in the wavelength range for the C band and when it is coated with a wide-area antireflection film, then the resulting Faraday rotator is favorable for use in wide-area wavelength communication since both the Faraday rotator itself and the antireflection film formed on it have the advantages of low absorbance and low reflectance. On the other hand, when the Fe element in magnetic garnet is substituted with any of the element of low absorbance, Ga, Al, Sc, In, Si, Ge, Ti, Au or Ir, the saturation magnetic field of the rotators made of the thus-substituted magnetic garnet can be controlled. Accordingly, the Fe substitution with any of these elements in magnetic garnet is favorable for planning devices of optical isolators, etc. However, too much substitution with the substitutable element, for example, exceeding 1.5 in terms of the substitution index of the element is unfavorable since the Curie temperature of the substituted magnetic garnet lowers to around room temperature and the Faraday rotators formed of such garnet are useless. Accordingly, the degree of substitution with the substitutable element in magnetic garnet is preferably at most 1.5 in terms of the substitution index of the element.

In wavelength division multiplexing systems, light is often amplified by a fiber amplifier set in the connections of optical fibers, and extremely strong light may pass through the optical fibers. If such strong light is led into Faraday rotators and if the light-input surface of the rotators is made of resin, the resin will be fired by the heat of the light and the device could no more function correctly. This is device operation failure. Therefore, the Faraday rotators to be used in passive devices in optical communication systems, such as polarization-dependent isolators to be used in the connections of optical fibers must not be coated with resin but must be exposed to air, and the light-input surface of the rotator of the type must be coated with an antireflection film which is to protect the surface from air. Accordingly, when a wide-area antireflection film is formed on the light-input surface of a Faraday rotator for protecting the surface from air, then the thus-coated Faraday rotator is extremely favorable for solving the trouble of operation failure of optical passive devices in wavelength division multiplexing systems that input high-intensity light and for improving the properties of the devices.

In case where Faraday rotators having a rotation angle of 45 degrees at various wavelengths in the C band in wavelength division multiplexing systems are fabricated and when an antireflection film capable of realizing a reflectance of at most 0.1% in the overall wavelength range for the C band is formed on the Faraday rotators, the antireflection film may be formed all at a time on different Faraday rotators for the C band in the same batch of film formation. In that manner, a wide-area antireflection film is formed all at a time on different types of Faraday rotators for different wavelengths, and the antireflection film thus formed has the ability to lower the reflectance at any wavelength. This solves the problem in the prior-art film formation that requires a complicated process, or that is, the process of the film formation in this embodiment is simplified and its productivity is improved.

The antireflection film and the optical device that comprises it of this embodiment are described more concretely with reference to the following Examples. The essential point in the following Examples is that a four-layered thin antireflection film is formed on both the light-input/light-output surfaces of a Faraday rotator formed of a Bi-substituted rare earth-iron-garnet material, and the antireflection film is so designed that the its reflectance in a wavelength range of 140 nm is at most 0.1%. Thus designed, the antireflection film is effective for reducing the reflection thereon in the overall wavelength range for all the S band, C band and L band in wavelength division multiplexing systems, and is therefore effective for improving the quality of passive devices in optical communication systems. Another advantage of the antireflection film is that the film may be formed on different types of Faraday rotators all at a time and the productivity of the film-coated Faraday rotators is high.

EXAMPLE 3-1

Figure 17:
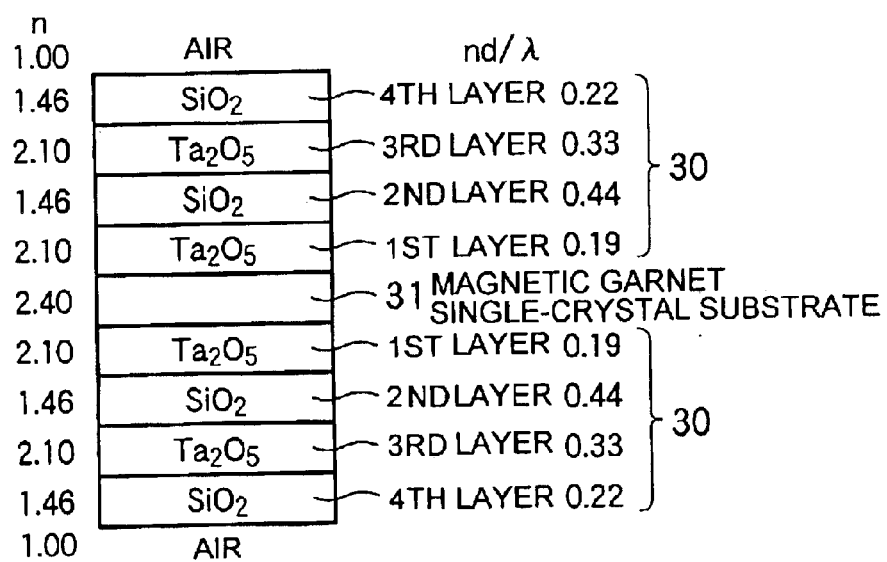
FIG. 17 is a view showing the condition of the antireflection film of Example 3-1 of the third embodiment of the invention, which is formed on both of the light-input/light-output surfaces of a magnetic garnet single-crystal substrate 31.

FIG. 17 shows the condition of the antireflection film 30 of this Example, which is formed on both of the light-input/light-output surfaces of a magnetic garnet single-crystal substrate 31. As in FIG. 17, a first layer, or that is, a first $Ta_2O_5$ layer of $nd/\lambda=0.19$ is formed on both surfaces of the magnetic garnet single-crystal substrate (Faraday rotator) 31; then a second layer, or that is, a first $SiO_2$ layer of $nd/\lambda=0.44$ is formed on that first layer; then a third layer, or that is, a second $Ta_2O_5$ layer of $nd/\lambda=0.33$ is formed on that second layer; and a fourth layer, or that is, a second $SiO_2$ layer of $nd/\lambda=0.22$ is formed on that third layer.

Based on the refractive index of air, 1, the refractive index, n, of the first and second $Ta_2O_5$ layers formed on both surfaces of the magnetic garnet single-crystal substrate 31 is 2.10, and the refractive index, n, of the first and second $SiO_2$ layers is 1.46.

The structure of FIG. 17 was fabricated as follows: A magnetic garnet single crystal having a compositional formula of $Bi_{1.1}Tb_{1.4}Y_{0.2}Yb_{0.1}Ho_{0.15}Pb_{0.05}Fe_{4.85}Ga_{0.1}Ge_{0.03}Pt_{0.02}O_{12}$ was first grown on a CaMgZr-substituted gadolinium-gallium-garnet (GGG) single-crystal substrate in a mode of liquid-phase epitaxial growth. Next, the magnetic garnet single crystal was worked into a Faraday rotator 31, of which the rotation angle to the light having a wavelength $\lambda$ of 1310 nm is 45 degrees. On both surfaces of the tabular Faraday rotator 31, formed were thin layers of $Ta_2O_5$, $SiO_2$, $Ta_2O_5$ and $SiO_2$ in that order through ion-assisted vacuum evaporation. Concretely, $nd/\lambda$ of the thus-formed first layer was 0.190, that of the second layer was 0.443, that of the third layer was 0.325 and that of the fourth layer was 0.217. The four-layered film formed on both surfaces of the rotator is an antireflection film to face air. Thus fabricated, this is an antireflection film-coated optical device.

Figure 18:
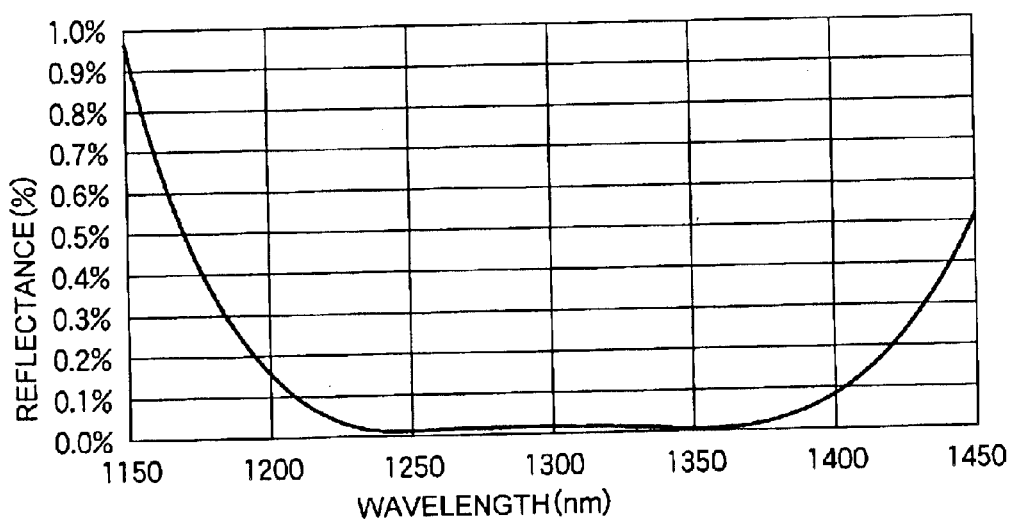
FIG. 18 is a graph showing the characteristics of the antireflection film of Example 3-1 of the third embodiment of the invention.

The reflectance of the antireflection film 30 on one surface of the optical device was measured with a spectrophotometer. FIG. 18 is a graph showing the characteristics of the antireflection film 30 of this Example. In FIG. 18, the horizontal axis indicates the wavelength (nm) of the light applied to the antireflection film of this Example; and the vertical axis indicates the reflectance (%) of the film measured. As in FIG. 18, the reflectance of the film was 0.02%, or that is, smaller than 0.1% in the overall region of the light wavelength $\lambda$ falling within 1240 nm$\leq\lambda\leq$1370 nm. In addition, the insertion loss in the Faraday rotator fabricated herein was measured in the overall region of 1240 nm$\leq\lambda\leq$1370 nm. The loss was 0.03 dB and was stable in that region. The data confirm that the reflectance and the insertion loss of the Faraday rotator fabricated in this Example are both low, or that is, the characteristics of the Faraday rotator are good in the overall wavelength region of 1240 nm$\leq\lambda\leq$1370 nm.

EXAMPLE 3-2

A magnetic garnet single crystal having a compositional formula of $Bi_{1.0}Gd_{1.5}Yb_{0.3}Ho_{0.15}Pb_{0.05}Fe_{4.85}Al_{0.1}Ge_{0.03}Pt_{0.02}O_{12}$ was grown on a CaMgZr-substituted gadolinium-gallium-garnet single-crystal substrate in a mode of liquid-phase epitaxial growth. Next, the magnetic garnet single crystal was worked into a Faraday rotator, of which the rotation angle to the light having a wavelength $\lambda$ of 1495 nm is 45 degrees. On both surfaces of the tabular Faraday rotator, formed were thin layers of $Ta_2O_5$, $SiO_2$, $Ta_2O_5$ and $SiO_2$ in that order through ion-assisted vacuum evaporation. Concretely, $nd/\lambda$ of the thus-formed first layer was 0.190, that of the second layer was 0.443, that of the third layer was 0.325 and that of the fourth layer was 0.217. The four-layered film formed on both surfaces of the rotator is an antireflection film to face air. Thus fabricated, this is an antireflection film-coated optical device.

Figure 19:
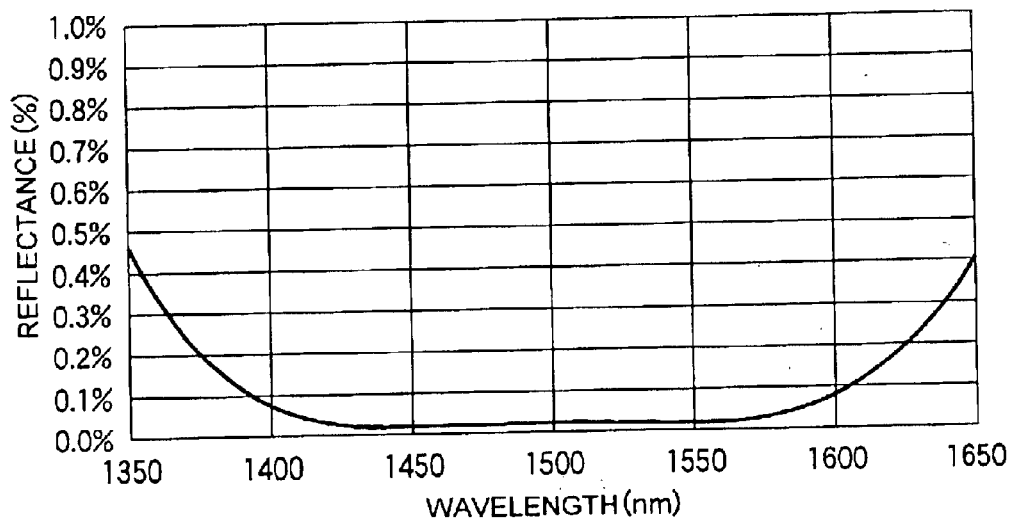
FIG. 19 is a graph showing the characteristics of the antireflection film of Example 3-2 of the third embodiment of the invention.

The reflectance of the antireflection film on one surface of the optical device was measured with a spectrophotometer. FIG. 19 is a graph showing the characteristics of the antireflection film of this Example. In FIG. 19, the horizontal axis indicates the wavelength (nm) of the light applied to the antireflection film of this Example; and the vertical axis indicates the reflectance (%) of the film measured. As in FIG. 19, the reflectance of the film was 0.02%, or that is, smaller than 0.1% in the overall region of the light wavelength $\lambda$ falling within 1425 nm$\leq\lambda\leq$1565 nm that includes the region for S band and that for C band in WDM. In addition, the insertion loss in the Faraday rotator fabricated herein was measured in the overall region of 1425 nm$\leq\lambda\leq$1565 nm. The loss was 0.03 dB and was stable in that region. The data confirm that the reflectance and the insertion loss of the Faraday rotator fabricated in this Example are both low, or that is, the characteristics of the Faraday rotator are good in the overall wavelength region of 1425 nm$\leq\lambda\leq$1565 nm.

EXAMPLE 3-3

A magnetic garnet single crystal having a compositional formula of $Bi_{1.1}Gd_{1.45}Yb_{0.4}Pb_{0.05}Fe_{4.95}Ge_{0.03}Pt_{0.02}O_{12}$ was grown on a CaMgZr-substituted gadolinium-gallium-garnet single-crystal substrate in a mode of liquid-phase epitaxial growth. Next, the magnetic garnet single crystal was worked into a Faraday rotator, of which the rotation angle to the light having a wavelength $\lambda$ of 1562 nm is 45 degrees. On both surfaces of the tabular Faraday rotator, formed were thin layers of $Ta_2O_5$, $SiO_2$, $Ta_2O_5$ and $SiO_2$ in that order through ion-assisted vacuum evaporation. Concretely, nd/$\lambda$ of the thus-formed first layer was 0.190, that of the second layer was 0.443, that of the third layer was 0.325 and that of the fourth layer was 0.217. The four-layered film formed on both surfaces of the rotator is an antireflection film to face air. Thus fabricated, this is an antireflection film-coated optical device.

Figure 20:
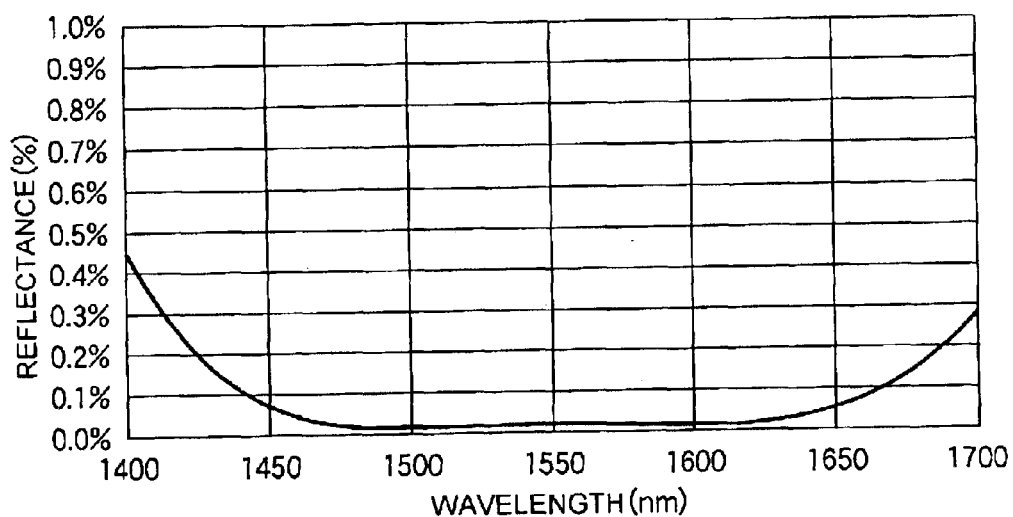
FIG. 20 is a graph showing the characteristics of the antireflection film of Example 3-3 of the third embodiment of the invention.

The reflectance of the antireflection film on one surface of the optical device was measured with a spectrophotometer. FIG. 20 is a graph showing the characteristics of the antireflection film of this Example. In FIG. 20, the horizontal axis indicates the wavelength (nm) of the light applied to the antireflection film of this Example; and the vertical axis indicates the reflectance (%) of the film measured. As in FIG. 20, the reflectance of the film was 0.02%, or that is, smaller than 0.1% in the overall region of the light wavelength $\lambda$ falling within 1492 nm$\leq\lambda\leq$1632 nm that includes the region for C band and that for L band in WDM. In addition, the reflectance of the film was not larger than 0.1% also in the overall region for S band (1460 nm$\leq\lambda\leq$1530 nm). Next, the insertion loss in the Faraday rotator fabricated herein was measured in the overall region of 1492 nm$\leq\lambda\leq$1632 nm. The loss was 0.03 dB and was stable in that region. The data confirm that the reflectance and the insertion loss of the Faraday rotator fabricated in this Example are both low, or that is, the characteristics of the Faraday rotator are good in the overall wavelength region of 1492 nm$\leq\lambda\leq$1632 nm.

EXAMPLE 3-4

A magnetic garnet single crystal having a compositional formula of $Bi_{1.1}Gd_{1.45}Yb_{0.4}Pb_{0.05}Fe_{4.95}Ge_{0.03}Pt_{0.02}O_{12}$ was grown on a CaMgZr-substituted gadolinium-gallium-garnet single-crystal substrate in a mode of liquid-phase epitaxial growth. Next, the magnetic garnet single crystal was worked into a Faraday rotator, of which the rotation angle to the light having a wavelength $\lambda$ of 1615 nm is 45 degrees. On both surfaces of the tabular Faraday rotator, formed were thin layers of $Ta_2O_5$, $SiO_2$, $Ta_2O_5$ and $SiO_2$ in that order through ion-assisted vacuum evaporation. Concretely, nd/$\lambda$ of the thus-formed first layer was 0.190, that of the second layer was 0.443, that of the third layer was 0.325 and that of the fourth layer was 0.217. The four-layered film formed on both surfaces of the rotator is an antireflection film to face air. Thus fabricated, this is an antireflection film-coated optical device.

Figure 21:
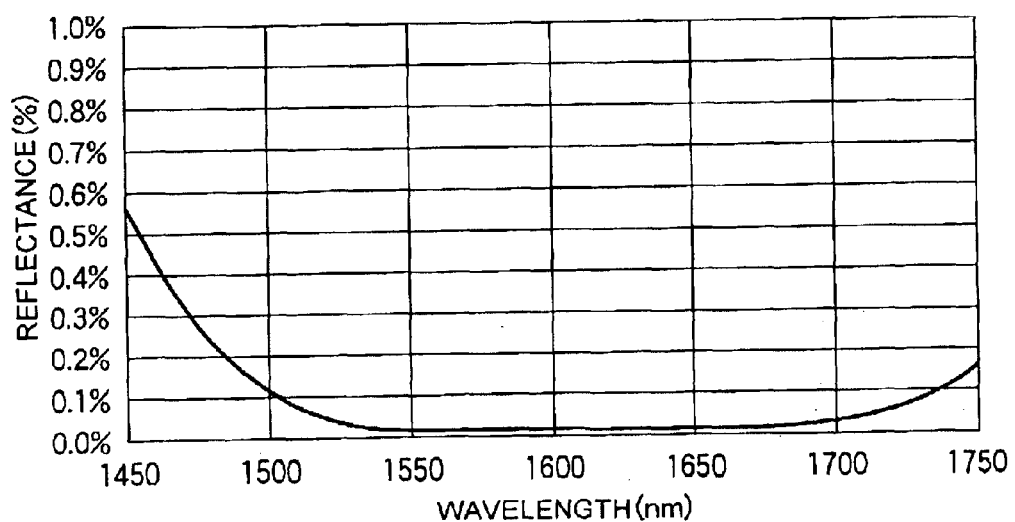
FIG. 21 is a graph showing the characteristics of the antireflection film of Example 3-4 of the third embodiment of the invention.

The reflectance of the antireflection film on one surface of the optical device was measured with a spectrophotometer. FIG. 21 is a graph showing the characteristics of the antireflection film of this Example. In FIG. 21, the horizontal axis indicates the wavelength (nm) of the light applied to the antireflection film of this Example; and the vertical axis indicates the reflectance (%) of the film measured. As in FIG. 21, the reflectance of the film was 0.02%, or that is, smaller than 0.1% in the overall region of the light wavelength $\lambda$ falling within 1545 nm$\leq\lambda\leq$1685 nm that includes the region for L band in WDM. In addition, the insertion loss in the Faraday rotator fabricated herein was measured in the overall region of 1545 nm$\leq\lambda\leq$1685 nm. The loss was 0.03 dB and was stable in that region. The data confirm that the reflectance and the insertion loss of the Faraday rotator fabricated in this Example are both low, or that is, the characteristics of the Faraday rotator are good in the overall wavelength region of 1545 nm$\leq\lambda\leq$1685 nm.

EXAMPLE 3-5

A magnetic garnet single crystal having a compositional formula of $Bi_{1.1}Gd_{1.45}Yb_{0.4}Pb_{0.05}Fe_{4.95}Ge_{0.03}Pt_{0.02}O_{12}$ was grown on a CaMgZr-substituted gadolinium-gallium-garnet single-crystal substrate in a mode of liquid-phase epitaxial growth. Next, the magnetic garnet single crystal was worked into a Faraday rotator, of which the rotation angle to the light having a wavelength $\lambda$ of 1750 nm is 45 degrees. On both surfaces of the tabular Faraday rotator, formed were thin layers of $Ta_2O_5$, $SiO_2$, $Ta_2O_5$ and $SiO_2$ in that order through ion-assisted vacuum evaporation. Concretely, nd/$\lambda$ of the thus-formed first layer was 0.190, that of the second layer was 0.443, that of the third layer was 0.325 and that of the fourth layer was 0.217. The four-layered film formed on both surfaces of the rotator is an antireflection film to face air. Thus fabricated, this is an antireflection film-coated optical device.

Figure 22:
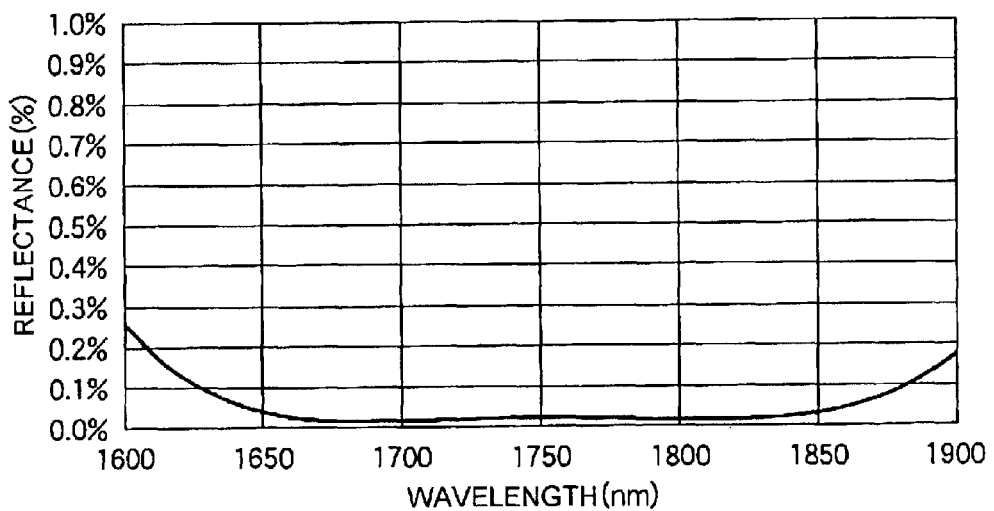
FIG. 22 is a graph showing the characteristics of the antireflection film of Example 3-5 of the third embodiment of the invention.

The reflectance of the antireflection film on one surface of the optical device was measured with a spectrophotometer. FIG. 22 is a graph showing the characteristics of the antireflection film of this Example. In FIG. 22, the horizontal axis indicates the wavelength (nm) of the light applied to the antireflection film of this Example; and the vertical axis indicates the reflectance (%) of the film measured. As in FIG. 22, the reflectance of the film was 0.02%, or that is, smaller than 0.1% in the overall region of the light wavelength $\lambda$ falling within 1680 nm$\leq\lambda\leq$1820 nm. In addition, the insertion loss in the Faraday rotator fabricated herein was measured in the overall region of 1680 nm$\leq\lambda\leq$1820 nm. The loss was 0.03 dB and was stable in that region. The data confirm that the reflectance and the insertion loss of the Faraday rotator fabricated in this Example are both low, or that is, the characteristics of the Faraday rotator are good in the overall wavelength region of 1680 nm$\leq\lambda\leq$1820 nm.

COMPARATIVE EXAMPLE 3-1

A magnetic garnet single crystal having a compositional formula of $Bi_{1.1}Gd_{1.45}Yb_{0.4}Pb_{0.05}Fe_{4.95}Ge_{0.03}Pt_{0.02}O_{12}$ was grown on a CaMgZr-substituted gadolinium-gallium-garnet single-crystal substrate in a mode of liquid-phase epitaxial growth. Next, the magnetic garnet single crystal was worked into a Faraday rotator, of which the rotation angle to the light having a wavelength $\lambda$ of 1550 nm is 45 degrees. On both surfaces of the tabular Faraday rotator, formed were thin layers of $Ta_2O_5$ and $SiO_2$ in that order through ion-assisted vacuum evaporation. The two-layered film formed on both surfaces of the rotator is an antireflection film to face air. Thus fabricated, this is an antireflection film-coated optical device.

Figure 23:
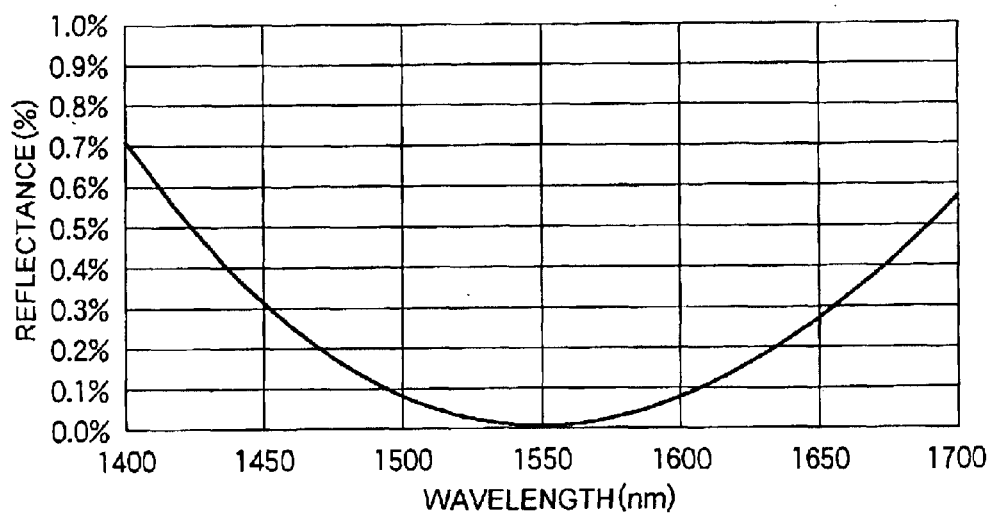
FIG. 23 is a graph showing the characteristics of the antireflection film of Comparative Example for the third embodiment of the invention.
Figure 24:
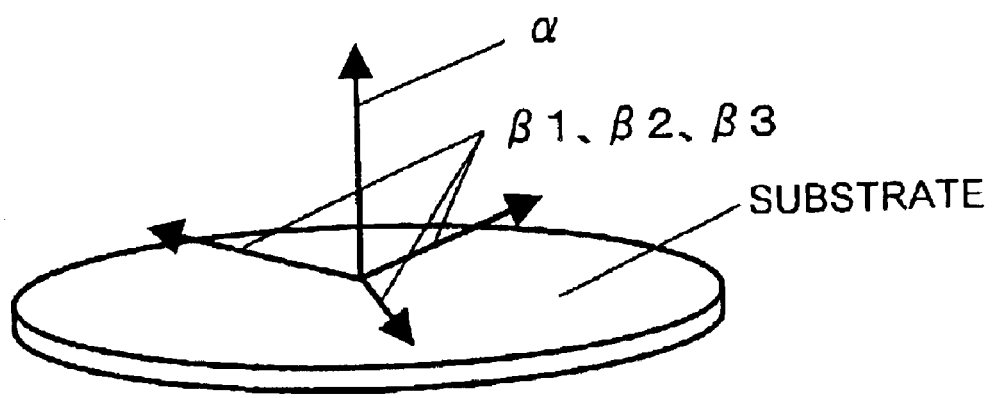
FIG. 24 is a view for explaining the condition of an easy axis not in the crystal growth direction <111> but in the other directions <111> nearer to the crystal growth surface.

The reflectance of the antireflection film on one surface of the optical device was measured with a spectrophotometer. FIG. 23 is a graph showing the characteristics of the antireflection film of this Comparative Example. In FIG. 23, the horizontal axis indicates the wavelength (nm) of the light applied to the antireflection film of this Comparative Example; and the vertical axis indicates the reflectance (%) of the film measured. As in FIG. 23, the reflectance of the film was 0.16% at a wavelength $\lambda$ of 1480 nm, and was 0.15% or less at $\lambda$ of 1620 nm. In addition, the insertion loss in the Faraday rotator fabricated herein was measured in the overall region of 1480 nm$\leq\lambda\leq$1620 nm. The loss was 0.03 dB and was stable in that region. The data confirm that the insertion loss of the Faraday rotator fabricated herein is low in the wavelength region of 1480 nm≦λ≦1620 nm, but the reflectance thereof increases at around the boundaries of the wavelength region. This means that the optical characteristics of the Faraday rotator are not good as it gives returning light.

As described hereinabove, this embodiment provides an antireflection film of low reflectance for Faraday rotators, of which the reflectance is at most 0.1% in the wide-area wavelength region for wavelength division multiplexing systems. Another advantage of this embodiment is that the same antireflection film formed herein is applicable to different types of Faraday rotators that are separately fabricated for the intended wavelength range, or that is, such different types of Faraday rotators may be coated with the same antireflection film all at a time in this embodiment and the productivity of the antireflection film-coated rotators is high.

As in the above, small-sized and power-saving magnetic circuits may be used for the optical device of the invention. In addition, the insertion loss through the Faraday rotator of the invention is reduced.

Further, the invention realizes an antireflection film having a low reflectance in a broad wavelength region and an optical device that comprises it. The advantage of the antireflection film is that it is easy to form and its production costs are low.

Other advantages of the Faraday rotator and the optical device that comprises it of the invention are that, even when the Bi-substituted rare earth-iron-garnet single-crystal film for the rotators is heated so as to weaken the growth-induced magnetic anisotropy of the film, the Faraday rotation angle fluctuation of the rotators is reduced and stabilized, and the variable angle of the rotators is wide.

What is claimed is:

1. An optical device comprising:
   a Faraday rotator formed of a garnet single crystal; and
   a magnetic circuit for applying an external magnetic field H substantially along the easy axis of the garnet single crystal that is smaller than a saturation magnetic field Hs of the Faraday rotator to the Faraday rotator.

2. The optical device as claimed in claim 1, wherein the garnet single crystal is represented by $Bi_aA_{3-a}Fe_{5-x}M_xO_{12}$;
   wherein A is at least one element of Y, Lu, Yb, Er, Ho, Dy, Tb, Gd, Eu, Sm, Nd, Pr, Ce, La, Pb and Ca; a satisfies 0.6≦a≦2.0; M is at least one element of Ga, Al, Sc, In, Si, Ge, Ti, Au, Ir and Pt; x satisfies 0≦x≦1.5.

3. The optical device as claimed in claim 1, wherein the garnet single crystal is represented by $Bi_bA_cB_{3-b-c}Fe_{5-x}M_xO_{12}$;
   wherein A is at least one element of Y, Lu, Yb, Er, Ho, Eu, Sm, Nd, Pr, Ce, La, Pb and Ca; B is at least one element of Tb, Gd and Dy; b and c satisfy 0.6≦b≦2.0 and 0.6<b+c≦3.0; M is at least one element of Ga, Al, Sc, In, Si, Ge, Ti, Au, Ir and Pt; and x satisfies 0≦x≦1.5.

4. The optical device as claimed in claim 1, wherein the external magnetic field H to be applied by the magnetic circuit is within a range of 0.4×|Hs|<|H|<|H|;
   wherein |H| indicates the intensity of the external magnetic field H and |Hs| indicates the intensity of the saturation magnetic field Hs.

5. The optical device as claimed in claim 4, wherein the magnetic circuit applies the external magnetic field H in the direction oblique to the light-input surface of the Faraday rotator.

6. The optical device as claimed in claim 5, wherein the external magnetic field H applied by the magnetic circuit to the Faraday rotator is a combination of multiple magnetic fields.

7. A Faraday rotator which is formed of a garnet single crystal and which satisfies the requirement of 1>F/Fs≧0.96,
   wherein Fs indicates a saturation rotation angle of the rotator having received a saturation magnetic field Hs thereof in a direction almost perpendicular to a light-input surface of the garnet single crystal and F indicates a Faraday rotation angle of the rotator having received an external magnetic field H of 0.9 times the saturation magnetic field Hs.

8. The Faraday rotator as claimed in claim 7, wherein the garnet single crystal is represented by $Bi_aA_{3-a}Fe_{5-x}M_xO_{12}$;
   wherein A is at least one element of Y, Lu, Yb, Er, Ho, Dy, Tb, Gd, Eu, Sm, Nd, Pr, Ce, La, Pb and Ca; a satisfies 0.6≦a≦2.0; M is at least one element of Ga, Al, Sc, In, Si, Ge, Ti, Au, Ir and Pt; and x satisfies 0≦x≦1.5.

9. The Faraday rotator as claimed in claim 7, wherein the garnet single crystal is represented by $Bi_bA_cB_{3-b-c}Fe_{5-x}M_xO_{12}$;
   wherein A is at least one element of Y, Lu, Yb, Er, Ho, Eu, Sm, Nd, Pr, Ce, La, Pb and Ca; B is at least one element of Tb, Gd and Dy; b and c satisfy 0.6≦b≦2.0 and 0.6<b+c≦3.0; M is at least one element of Ga, Al, Sc, In, Si, Ge, Ti, Au, Ir and Pt; and x satisfies 0≦x≦1.5.

10. The Faraday rotator as claimed in claim 7, wherein the Faraday rotation angle F can be varied by controlling the external magnetic field H to be applied thereto.

11. An optical device comprising:
    a Faraday rotator of claim 7; and
    a magnetic circuit for applying an external magnetic field H to the Faraday rotator.

12. An antireflection film of a first $Ta_2O_5$ layer that satisfies 0.17≦nd/λ≦0.80, a first $SiO_2$ layer that satisfies 0.02≦nd/λ0.54, a second $Ta_2O_5$ layer that satisfies 0.16≦nd/λ≦0.38 and a second $SiO_2$ layer that satisfies 0.20≦nd/λ≦0.29, formed in that order on a surface of a substrate, wherein λ indicates a wavelength of a transmitted light, n indicates a refractive index of each layer, and d indicates a thickness of each layer.

13. The antireflection film as claimed in claim 12, wherein an opposite surface of the film opposed to the surface of the substrate faces air.

14. The antireflection film as claimed in claim 13, wherein a reflectivity is at most 0.1% in a wavelength range of λ+/−70 nm around a wavelength λ of the transmitted light.

15. The antireflection film as claimed in claim 14, wherein the wavelength λ is in the range of 1310 nm≦λ≦1750 nm.

16. An optical device comprising:
    a garnet single crystal; and
    wherein a light-input surface and a light-output surface of the garnet single crystal are coated with the antireflection film of claim 12.

17. The optical device as claimed in claim 16, wherein the garnet single crystal is represented by $Bi_aA_{3-a}Fe_{5-x}M_xO_{12}$;
    wherein A is at least one element of Y, Lu, Yb, Er, Ho, Dy, Tb, Gd, Eu, Sm, Nd, Pr, Ce, La, Pb and Ca; M is at least one element of Ga, Al, Sc, In, Si, Ge, Ti, Au and Ir; a and x satisfy 1.0≦a≦2.4 and 0≦x≦1.5.

18. The optical device as claimed in claim 16, wherein the garnet single crystal is represented by $Bi_aA_bB_{3-a-b}Fe_{5-x}M_xO_{12}$;
    wherein A is at least one element of Er, Dy, Tb, Sm, Nd and Pr; B is at least one element of Y, Lu, Yb, Ho, Gd, Ce, La, Pb and Ca; M is at least one element of Ga, Al, Sc, In, Si, Ge, Ti, Au and Ir; and a, b and x satisfy $1.0 < a \leq 2.4$, $0 \leq b \leq 0.1$, and $0 \leq x \leq 1.5$.

19. The optical device as claimed in claim 16, wherein a reflectivity is at most 0.1% in overall wavelength range of 1460 nm$\leq \lambda \leq$1530 nm wherein $\lambda$ indicates a wavelength of light.

20. The optical device as claimed in claim 16, wherein a reflectivity is at most 0.1% in overall wavelength range of 1530 nm$\leq \lambda \leq$1565 nm wherein $\lambda$ indicates a wavelength of light.

21. The optical device as claimed in claim 16, wherein a reflectivity is at most 0.1% in overall wavelength range of 1565 nm$\leq \lambda \leq$1625 nm wherein $\lambda$ indicates a wavelength of light.

22. The optical device as claimed in claim 16, wherein the garnet single crystal forms a Faraday rotator.

23. An optical isolator comprising:

a Faraday rotator with an antireflection film formed on light-input/light-output surfaces;

wherein the antireflection film is the antireflection film of claim 12.

24. An optical attenuator comprising:

a Faraday rotator with an antireflection film formed on light-input/light-output surfaces;

wherein the antireflection film is the antireflection film of claim 12.

25. An optical device comprising:

a Faraday rotator formed of a garnet single crystal; and a magnetic circuit for applying an external magnetic field H that is smaller than a saturation magnetic field Hs of the Faraday rotator to the Faraday rotator, wherein the external magnetic field H to be applied by the magnetic circuit is within a range of $0.4 \times |Hs| < |H| < |Hs|$;

wherein $|H|$ indicates the intensity of the external magnetic field H and $|Hs|$ indicates the intensity of the saturation magnetic field Hs.

26. The optical device as claimed in claim 25, wherein the magnetic circuit applies the external magnetic field H in the direction oblique to the light-input surface of the Faraday rotator.

27. The optical device as claimed in claim 25, wherein the external magnetic field H applied by the magnetic circuit to the Faraday rotator is a combination of multiple magnetic fields.

* * * * *